US011685323B2

(12) United States Patent
Liu et al.

(10) Patent No.: US 11,685,323 B2
(45) Date of Patent: Jun. 27, 2023

(54) OFF-ROAD VEHICLE

(71) Applicant: Zhejiang CFMOTO Power Co., Ltd., Zhejiang (CN)

(72) Inventors: Guo Liu, Hangzhou (CN); Wenwu Li, Hangzhou (CN); Chuanwen Bi, Hangzhou (CN); Zhangjun Deng, Hangzhou (CN)

(73) Assignee: Zhejiang CFMOTO Power Co., Ltd., Zhejiang (CN)

( * ) Notice: Subject to any disclaimer, the term of this patent is extended or adjusted under 35 U.S.C. 154(b) by 0 days.

(21) Appl. No.: 17/896,975

(22) Filed: Aug. 26, 2022

(65) Prior Publication Data
US 2023/0068183 A1 Mar. 2, 2023

(30) Foreign Application Priority Data

| Aug. 31, 2021 | (CN) | 202111010522.6 |
| May 5, 2022 | (CN) | 202210481896.4 |
| May 12, 2022 | (CN) | 202210513298.0 |
| Jul. 29, 2022 | (CN) | 202222016034.2 |

(51) Int. Cl.
*B60R 16/033* (2006.01)
*B60R 16/03* (2006.01)
*H02J 7/14* (2006.01)

(52) U.S. Cl.
CPC ........ *B60R 16/033* (2013.01); *B60R 16/0315* (2013.01); *H02J 7/1423* (2013.01)

(58) Field of Classification Search
None
See application file for complete search history.

(56) References Cited

U.S. PATENT DOCUMENTS

| 5,686,818 A | 11/1997 | Scaduto |
| 2001/0024102 A1 | 9/2001 | Egami |
| 2007/0252559 A1 | 11/2007 | Uhl |

(Continued)

FOREIGN PATENT DOCUMENTS

| CN | 1918767 A | 1/2007 |
| CN | 102386829 A | 3/2012 |

(Continued)

OTHER PUBLICATIONS

European Patent Office, Extended Search Report in 22192424.1-1202, dated Jan. 30, 3023, 9 pages.

*Primary Examiner* — Jared Fureman
*Assistant Examiner* — Aqeel H Bukhari
(74) *Attorney, Agent, or Firm* — Shewchuk IP Services, LLC; Jeffrey D. Shewchuk

(57) ABSTRACT

An off-road vehicle includes a vehicle body, a power system, electrical devices, an electricity storage bank, a generator, and an electric power regulator. The electric power regulator is used to regulate the voltage output from the generator to the electricity storage bank and corresponds to the electricity storage bank. The electric power regulator includes a voltage regulating chip, a switch circuit and voltage stabilizing circuit. The electric power regulator is capable of regulating the voltage output from the generator to the electricity storage bank according to the nominal voltage of the electricity storage bank, and the output voltage of the electric power regulator is greater than the bank voltage.

20 Claims, 15 Drawing Sheets

(56) References Cited

U.S. PATENT DOCUMENTS

| | | |
|---|---|---|
| 2011/0080040 A1 | 4/2011 | Kumar |
| 2012/0255799 A1* | 10/2012 | Kohler .................... B60L 58/20 |
| | | 180/65.245 |
| 2013/0249468 A1 | 9/2013 | Bajjuri et al. |
| 2014/0207318 A1 | 7/2014 | Sisk et al. |
| 2015/0258950 A1 | 9/2015 | Namuduri et al. |
| 2016/0185207 A1 | 6/2016 | Gerschutz et al. |
| 2018/0222311 A1* | 8/2018 | Toupin ................... B60K 11/06 |
| 2019/0047652 A1* | 2/2019 | Laberge ................... B62M 9/08 |
| 2020/0003116 A1 | 1/2020 | Matsukuma et al. |
| 2021/0354760 A1* | 11/2021 | Schleif ...................... F02B 5/00 |
| 2022/0154678 A1 | 5/2022 | Zhang |

FOREIGN PATENT DOCUMENTS

| | | |
|---|---|---|
| CN | 102812614 A | 12/2012 |
| CN | 103238260 A | 8/2013 |
| CN | 104904092 A | 9/2015 |
| CN | 105270192 A | 1/2016 |
| CN | 105874189 A | 7/2016 |
| CN | 206060330 U | 3/2017 |
| CN | 106877478 A | 6/2017 |
| CN | 108128370 A | 6/2018 |
| CN | 110446839 A | 11/2019 |
| CN | 112590686 A | 4/2021 |
| CN | 112612356 A | 4/2021 |
| CN | 112865276 A | 5/2021 |
| CN | 213948661 U | 8/2021 |
| CN | 113942491 A | 1/2022 |
| CN | 114103872 A | 3/2022 |
| CN | 215921890 A | 3/2022 |
| CN | 215922044 A | 3/2022 |
| DE | 199 30 017 A1 | 1/2001 |
| EP | 3064748 | 9/2016 |
| KR | 10-2005-0054624 A | 6/2005 |
| TW | 454945 U | 6/2013 |
| TW | 617814 U | 10/2021 |
| WO | 2014141784 A1 | 9/2014 |

* cited by examiner

OFF-ROAD VEHICLE

The present application claims the benefits of priority to Chinese Patent Application No. 202111010522.6, filed with the Chinese Patent Office on Aug. 31, 2021, Chinese Patent Application No. 202210481896.4, filed with the Chinese Patent Office on May 5, 2022, Chinese Patent Application No. 202210513298.0, filed with the Chinese Patent Office on May 12, 2022, and Chinese Patent Application No. 202222016034.2, filed with the Chinese Patent Office on Jul. 29, 2022. The entire contents of the above-referenced applications are incorporated herein by reference.

FIELD OF THE DISCLOSURE

The present application relates to a vehicle, and in particular to an off-road vehicle.

BACKGROUND OF THE DISCLOSURE

The number and power usage of various types of electrical devices on off-road vehicles, such as spotlights, air conditioners, sound systems and the like, are increasing over time for better user experience, resulting in a gradual increase in the total electric power consumption of the off-road vehicle.

One way to address this issue is to increase the output current from the generator. However, it is known that the heat generated by the coils of the generator is quadrupled when the output current from the generator is doubled according to the formula $P=RI^2$ (P is the heating power of coils, R is the resistance of the windings of the generator, and I is the current of the windings of the generator). The increased heat generated by the coils of the generator causes problems of increased energy loss and increased fuel consumption. Further, the generator may be burned out when the generator heats up and the winding coils reach the temperature tolerance limit (the temperature tolerance limit of many winding coils is 220° C.).

Another way to provide more electric power is to use a generator with a more complex rotor structure or excitation coils, such as an excitation generator. However, excitation generators commonly have the disadvantage of being bulky. An off-road vehicle and its engine structure are required to be more compact, water-proof, and dust-proof due to the off-road function and the complex running environment, such as dusty and sandy deserts and muddy and watery swamps. Therefore, the space available for the arrangement of the generator on the off-road vehicle is limited.

There is a need for meeting the demand of gradual increase of the total electric power of off-road vehicles and providing an electrical power supply system more suitable for modern off-road vehicles.

SUMMARY OF THE DISCLOSURE

In this application, an off-road vehicle is provided to solve the problem of high-power electricity consumption. Compared with increasing the output power of the generator by increasing the volume of the generator or by increasing the current, the application effectively avoids the problem of burning out the generator due to excessive coil heat of the generator and the problem of limited space.

The present invention involves an off-road vehicle comprising: a vehicle body; a plurality of wheels comprising at least one front wheel and at least one rear wheel; at least one seat disposed on the vehicle body, the seat comprising at least a driver's seat; a suspension system comprising a front suspension and a rear suspension, the at least one front wheel being connected to the vehicle body by the front suspension, and the at least one rear wheel being connected to the vehicle body by the rear suspension; a power system for providing power to the off-road vehicle disposed on the vehicle body, at least one of the front wheel and the rear wheel being connected to the power system, the power system comprising at least an engine; an operator manual control disposed on the vehicle body for manipulating the running of the off-road vehicle; an electrical load on the vehicle body, the electrical load comprising at least a starter motor for starting the engine of the off-road vehicle; an electricity storage bank disposed on the vehicle body, the electricity storage bank being connected to the electrical load, and the electricity storage bank being at least used to supply electric power for the starter motor when the engine needs to be started, and the starter motor after powered driving the engine to start; and an electrical power supply system comprising a generator for generating electric energy disposed on the power system, and the electric energy generated by the generator is used to supply electric power for the electricity storage bank. The electrical power supply system further includes an electric power regulator disposed on the vehicle body for regulating the voltage output from the generator to the electricity storage bank. The electric power regulator is disposed between the generator and the electricity storage bank. The generator is a permanent magnet generator. The nominal voltage of the electricity storage bank is defined as the bank voltage, the ratio of the bank voltage to a reference voltage is in the range from 2 to 3, and the reference voltage is in the range from 12V to 24V. The electric power regulator corresponds to the electricity storage bank, such as by outputting a DC voltage and current appropriate for charging of the electricity storage bank. The electric power regulator includes a sampling circuit, a voltage regulating control circuit and a switching circuit. The voltage regulating control circuit is respectively connected to the sampling circuit and the switching circuit. The electric power regulator is capable of regulating the voltage output from the generator to the electricity storage bank according to the nominal voltage of the electricity storage bank, and the output voltage of the electric power regulator is greater than the bank voltage. The sampling circuit is also connected to the electricity storage bank in addition to being connected to the voltage regulating control circuit. The sampling circuit is used to detect the actual voltage of the electricity storage bank, and the voltage regulating control circuit controls the conducting time of the switching circuit based on the actual voltage and a preset target voltage; and the preset target voltage corresponds to the nominal voltage of the electricity storage bank.

This invention solves the increased electricity usage problem of off-road vehicles. Compared with increasing the output power of the generator by increasing the volume of the generator or by increasing the current, the embodiments of the disclosure effectively avoid both the problem of burning the generator due to excessive coil heat of the generator and the problem of limited space, and is more suitable for off-road vehicles.

For better understanding of other features, objects and advantages of the disclosure, the details of one or more embodiments of the present disclosure are set forth in the drawings and the description below.

BRIEF DESCRIPTION OF THE DRAWINGS

The drawings described herein are used to provide better understanding of the present disclosure, in which.

Figure 1:
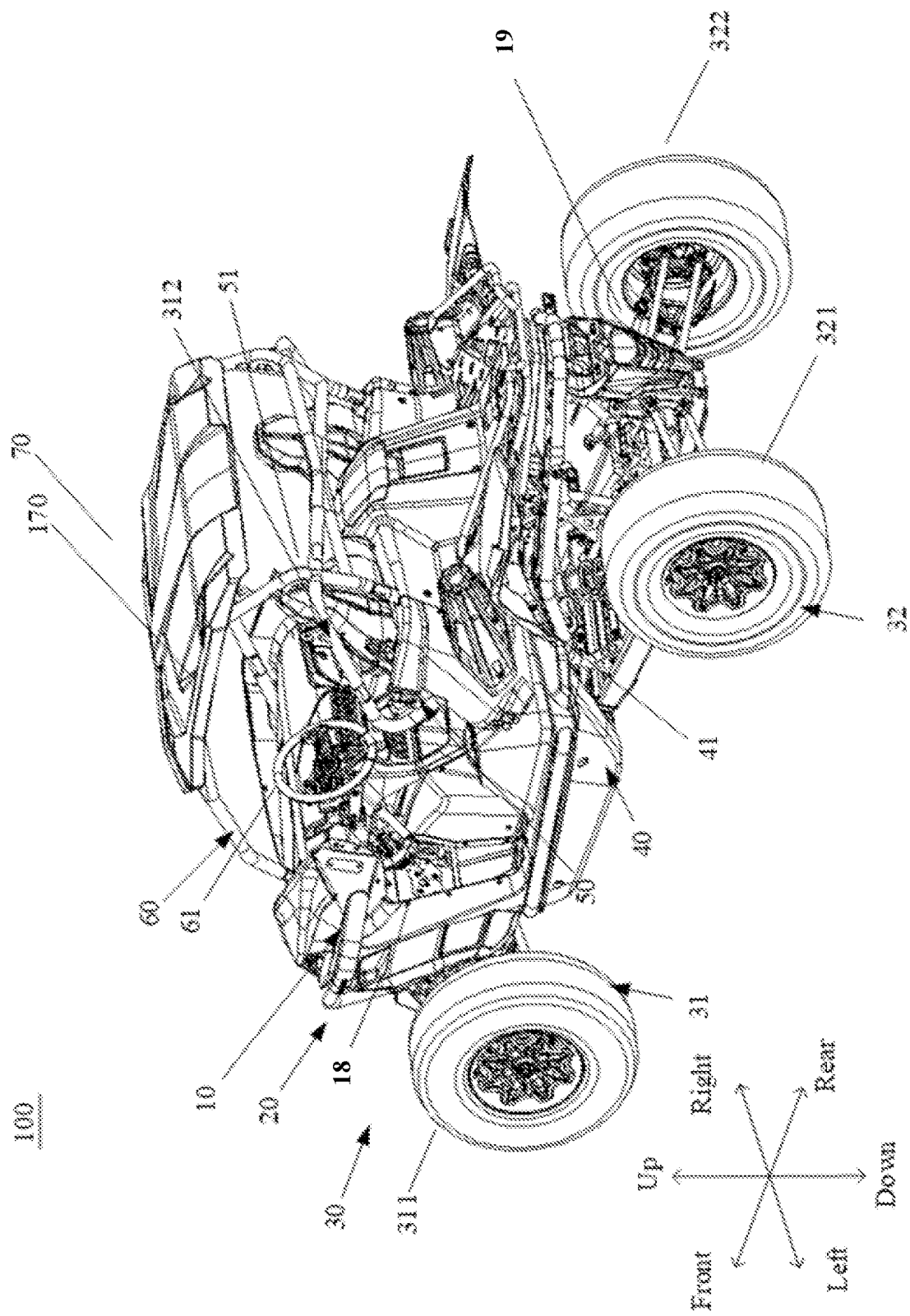
FIG. 1 is a schematic view of a four-wheeled off-road vehicle according to an embodiment of the present disclosure.

While the above-identified drawing figures set forth preferred embodiments, other embodiments of the present disclosure are also contemplated, some of which are noted in the discussion. In all cases, this disclosure presents the illustrated embodiments of the present disclosure by way of representation and not limitation. Numerous other minor modifications and embodiments can be devised by those skilled in the art which fall within the scope and spirit of the principles of this disclosure.

DETAILED DESCRIPTION

For a better understanding of the purpose, technical solutions and advantages of the present disclosure, preferred embodiments of the present disclosure are described and illustrated below.

Unless otherwise defined, the technical or scientific terms involved in this specification shall have the general meaning understood by a person with ordinary skill in the technical field to which this disclosure belongs. As used in this specification, the terms "a", "an", "the", "these", and the like do not denote quantitative limitations, and they may be singular or plural. As used in this specification, the terms "comprising", "including", "having" and any variations thereof are intended to cover non-exclusive inclusion; for example, a process, method, system, product or device including a series of steps or modules (units) are not limited to only the listed steps or modules (units), but may include unlisted steps or modules (units), or may include other steps or modules (units) inherent to these processes, methods, products or devices. As used in this specification, the terms "connected to", "linked to" "coupled to" and the like are not limited to physical or mechanical connections, but may include electrical connections, whether directly or indirectly. As used in this specification, the term "a plurality of" refers to two or more. The term "and/or" describes the relationship between associated objects, indicating that there may be three kinds of relationships, for example, "A and/or B" means A and B, A alone, and B alone. Normally, the character "I" indicates that the objects or terms associated with each other are an "or" relationship. As used in this specification, the terms "first", "second", "third" and the like are only for distinguishing similar objects, and do not represent a specific order for the objects. As used in this specification, the term "transmission device" is an intermediate device that transmits the power of the power system to the wheels, for example a gearbox. As used in this specification, the term "off-road vehicle" refers to a vehicle that is designed to travel over rough ground.

Off-road vehicles come in a range of types and functions, from expedition vehicles to recreational, construction, technical vehicles, and off-road racing vehicles. Off-road vehicles may be dedicated off-road vehicles or vehicles with the capability of going off-road as well as being used on urban roadways. Off-road vehicles of the present disclosure may be divided into different types, including two-wheeled off-road vehicles, three-wheeled off-road vehicles, and four-wheeled off-road vehicles. The two-wheeled off-road vehicle may be an Enduro Bike, Motocross Bike, Trail Bike, or the like. The four-wheeled off-road vehicle may be an ATV (All-Terrain Vehicle, driving on various roads), UTV (Utility Vehicle, multi-purpose vehicle), SSV (Side by Side Vehicle, tandem vehicle), or the like. In addition, embodiments of the present disclosure may be applied to motorcycles.

Please refer to FIG. 1 as an example of a four-wheeled off-road vehicle 100 which includes a vehicle body 10, a suspension system 20, a plurality of wheels 30, a power system 40, a seat 50, an operator manual control 60, and a ceiling or roof 70.

The four-wheeled off-road vehicle 100 may include a front part and a rear part according to the driving direction. The directions of front, rear, left, right, up and down are defined in FIG. 1 for clarity.

The vehicle body 10 preferably includes a frame and one or more exterior body panels. The wheels 30 preferably include two front wheels 31 and two rear wheels 32. The front wheels 31 include a first/left front wheel 311 and a second/right front wheel 312 (hidden in the drawing, with a lead line arrow pointing toward its location), and the rear wheels 32 includes a first/left rear wheel 321 and a second/right rear wheel 322.

The suspension system 20 includes a front suspension 18 and a rear suspension 19. The first/left front wheel 311 and the second/right front wheel 312 are connected to the vehicle body 10 by the front suspension 18, and the first/left rear wheel 321 and the second/right rear wheel 322 are connected to the vehicle body 10 by the rear suspension 19.

The power system 40 for providing power for locomotion of the four-wheeled off-road vehicle 100 is at least partially disposed on the vehicle body 10. At least one of the first/left front wheel 311, the second/right front wheel 312, the first/left rear wheel 321, and the second/right rear wheel 322 is connected to the power system 40 by a transmission device. The power system 40 includes at least an engine 41, preferably an internal combustion engine.

The seat 50 is disposed on the vehicle body 10 and includes at least a driver's seat 51.

At least one operator manual control 60 is used to manipulating the running of the four-wheeled off-road vehicle 100. Some types of operator manual controls, such as a throttle pedal or lever, may be mechanically or electrically connected to the power system 40, and other types operator manual controls, such as a gear selector lever, may be mechanically or electrically connected to the transmission device. As shown in FIG. 1, one operator manual control 60 includes a direction manipulation component such as a steering wheel 61 located in front of the driver's seat 51, preferably mechanically connected to the front wheels 31.

A ceiling/roof 70 is mounted above the vehicle body 10. A cabin 170 is defined by the vehicle body 10 between the ceiling 70 and the seat 50, generally behind the steering wheel 61. It should be noted that the four-wheeled off-road vehicle 100 may not include the ceiling/roof 70.

Figure 2:
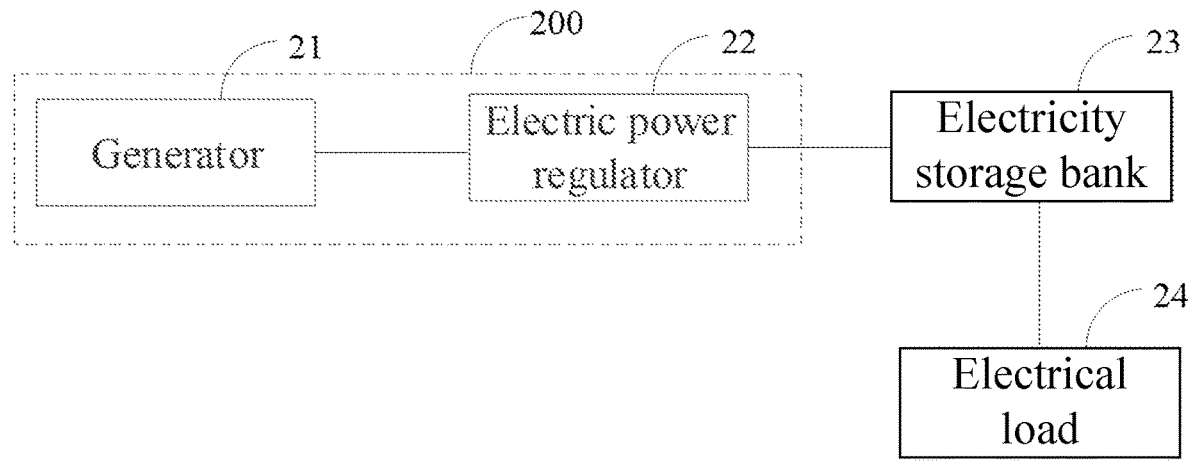
FIG. 2 is a block diagram of a power supply layout in an electrical power supply system of the off-road vehicle according to an embodiment of the present disclosure.

As called out in FIG. 2, an electrical power supply system 200 for the off-road vehicle 100 includes an electrical load 24, an electricity storage bank 23, a generator 21 and an electric power regulator 22. The electrical load 24 for the off-road vehicle 100 includes at least a starter motor 243 for starting the engine 41.

An electricity storage bank 23 is disposed on the vehicle body 10. The electricity storage bank 23, such as one or multiple batteries each having one or multiple battery cells, is electrically connected to the electrical load 24. The electricity storage bank 23 is at least used to supply electric power for the starter motor 243 when the engine 41 needs to be started, and the starter motor 243 when powered rotationally drives the engine to start internal combustion operation.

The generator 21 of the electrical power supply system 200 is mechanically coupled to the power system 40 to generate electrical energy, and the electrical energy generated by the generator 21 is used to supply electric power for charging the electricity storage bank 23. The electric power regulator 22 for regulating the voltage output from the generator 21 to the electricity storage bank 23 is disposed on the vehicle body 10, and the electric power regulator 22 is connected between the generator 21 and the electricity storage bank 23.

The electrical system for the off-road vehicle 100 has a "reference voltage", which is the nominal voltage of a single battery in the field of off-road vehicles. Each battery in the electricity storage bank 23 has its nominal voltage as a physical parameter, (typically the fully-charged open circuit voltage, that is, the voltage value without any load and no current output). In the United States at the time of the invention, the reference voltage is 12V, because single storage batteries in the field of off-road vehicles generally have a nominal voltage of 12V, such as 12V5AH, 12V7AH, 12V9AH, or the like. However, off-road vehicles made for certain markets outside the United States that more commonly use 24V batteries might have a reference voltage of 24V, and the batteries most commonly used in U.S. off-road vehicles might change from 12V (such as to 18V or 24V) in the future, allowing the possibility that the reference voltage for U.S. vehicles might change in the future to a value other than 12V. The nominal voltage of the electricity storage bank 23 is defined as a "bank voltage". The bank voltage is greater than the vehicle's reference voltage, and the ratio of the bank voltage to the vehicle's reference voltage is in the range from 2 to 4 and more preferably in the range from 2 to 3. The electric power regulator 22 is selected, designed and/or controlled to correspond to the electricity storage bank 23, including outputting a voltage and current appropriate for charging of the electricity storage bank 23. The electric power regulator 22 is capable of regulating the voltage output from the generator 21 to the electricity storage bank 23 to a regulated level above the bank voltage. For example, nominal voltages of the commonly used lead-acid storage batteries are 12V (such that 12V vehicle batteries are easy to purchase from the market and have a strong universality), and the electricity storage bank 23 for a vehicle having a 12V reference voltage could include multiple 12V lead-acid batteries connected in series. Alternatively, 24V lead-acid storage batteries are available, and the electricity storage bank 23 for a vehicle having a 12V reference voltage could include or one or more 24V lead-acid batteries connected in series or parallel.

Figure 3:
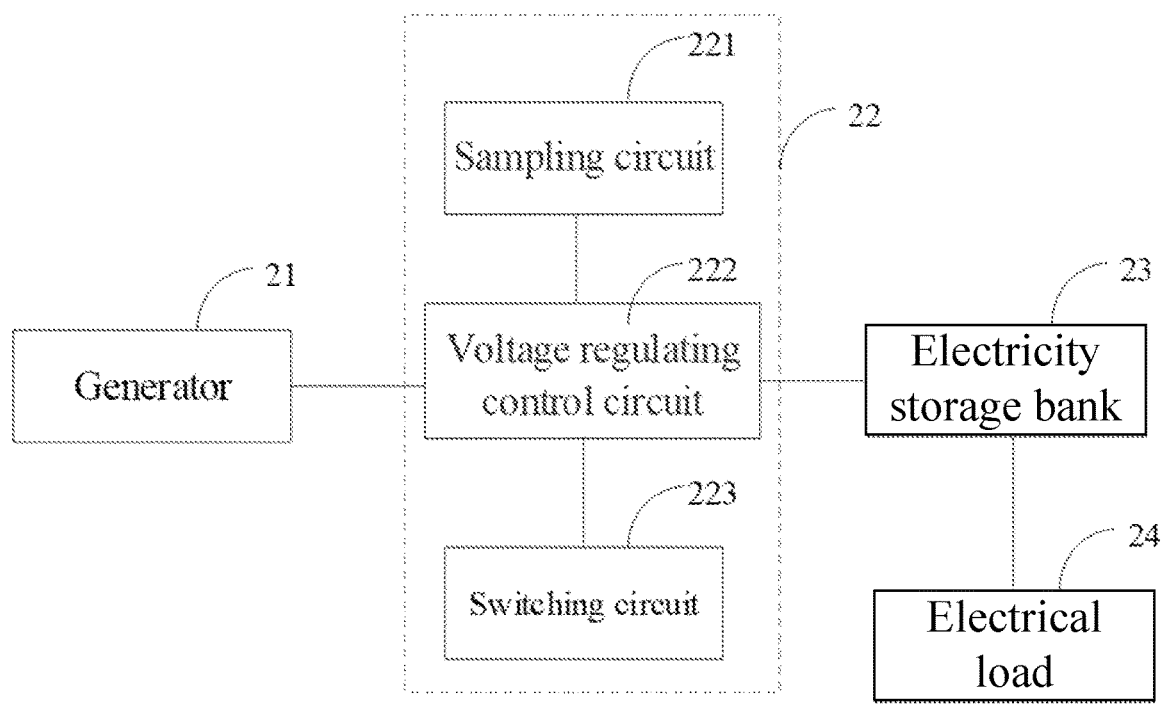
FIG. 3 is a more detailed block diagram of the electrical power supply system of the off-road vehicle according to an embodiment of the present disclosure.

The generator 21 is a permanent magnet generator, and the electricity generated by the generator 21 is output to the electricity storage bank 23 through the electric power regulator 22. The electric power regulator 22 is capable of converting the alternating current generated by the generator 21 into direct current in addition to performing the function of adjusting the voltage output from the generator 21 to the electricity storage bank 23 according to the nominal voltage of the electricity storage bank 23. The electric power regulator 22 is also called a voltage regulator. As shown in FIG. 3, the electric power regulator 22 preferably includes a sampling circuit 221, a voltage regulating control circuit 222 and a switch circuit 223, and the voltage regulating control circuit 222 is respectively connected to the sampling circuit 221 and the switch circuit 223. The electricity storage bank 23 has a nominal voltage twice or more than the reference voltage. Multiple storage batteries, for example two storage batteries or three storage batteries, can be combined in series for use. The off-road vehicle in this embodiment of the present disclosure increases the output power of the generator 21 by using the electricity storage bank 23 with a nominal voltage twice or more than the reference voltage and by using the electric power regulator 22 corresponding to the electricity storage bank 23, so as to solve the electrical power supply problem. Compared with increasing the output power of the generator 21 by increasing the volume of the generator 21 or by increasing the current, the invention effectively avoids the problem of burning out the generator 21 due to excessive coil heat of the generator 21 and the problem of limited space, and is more suitable for off-road vehicles.

Figure 4:
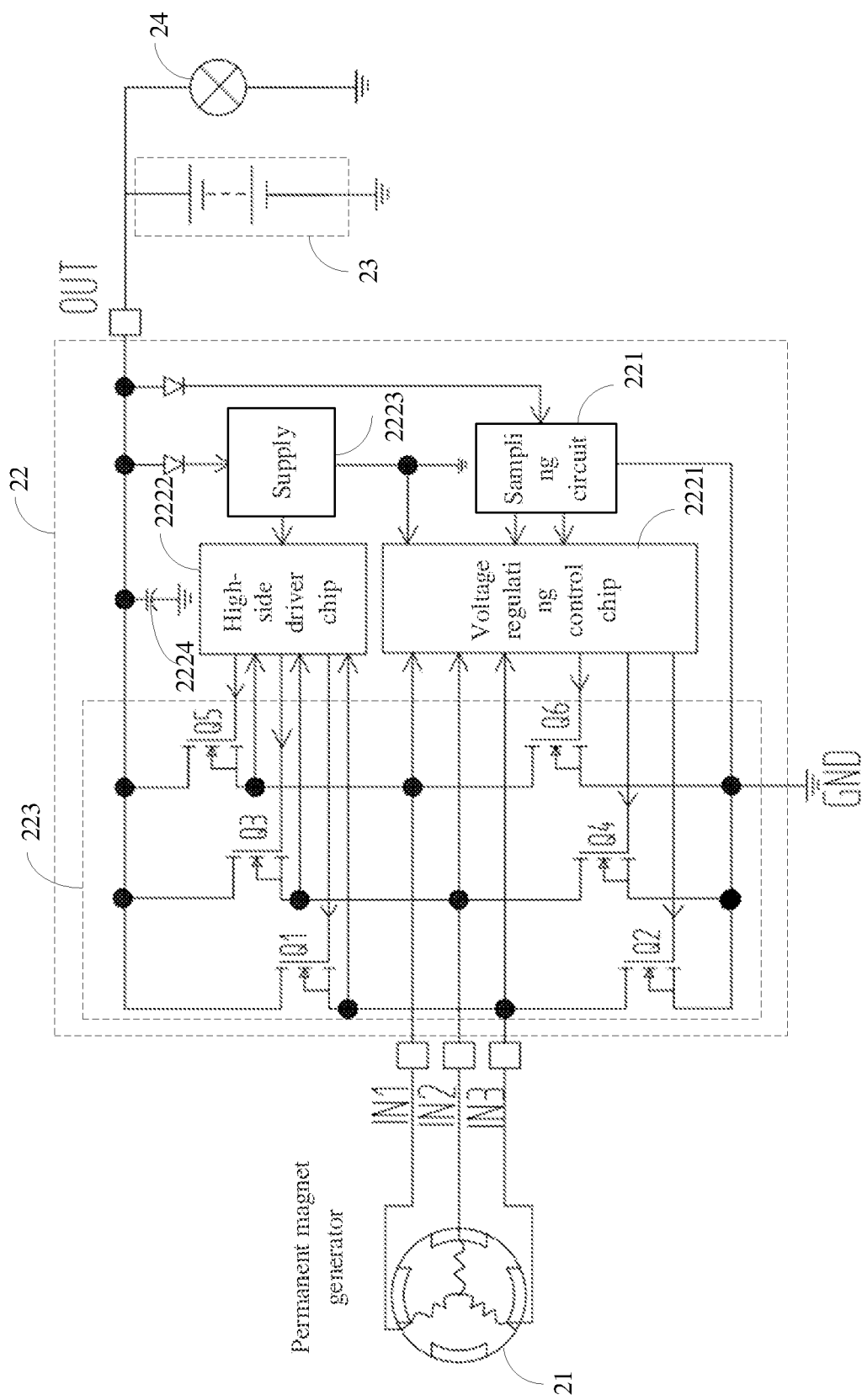
FIG. 4 is a circuit diagram detailing a portion of the electric power regulator of the off-road vehicle according to an embodiment of the present disclosure.

It should be noted that the generator 21 is driven to generate electricity after the engine 41 is started. The electricity generated by the generator 21 is regulated by the electric power regulator 22 and output to the electricity storage bank 23. In some embodiments, the electricity generated by the generator 21 is output to the electrical load 24 through both the electric power regulator 22 and the electricity storage bank 23, while in other embodiments the electricity generated by the generator 21 is regulated by the electric power regulator 22 and output directly to all or part of the electrical load 24. In the embodiment shown in FIG. 4, the electric power regulator 22 is a voltage regulator connected between the generator 21 and both the electricity storage bank 23 and the load 24. Among them, the OUT terminal is the DC positive electrode, and the GND is the DC negative electrode. The electric power regulator 22 includes a sampling circuit 221, a voltage regulating control circuit 222 and a switch circuit 223, and the voltage regulating control circuit 222 is respectively connected to the sampling circuit 221 and the switch circuit 223. The sampling circuit 221 is also connected to the electricity storage bank 23 in addition to being connected to the voltage regulating control circuit 222. The sampling circuit 221 is used to detect the actual voltage of the electricity storage bank 23, and the voltage regulating control circuit 222 controls the conducting time of the switching circuit 223 based on the actual voltage and a preset target voltage; and the preset target voltage corresponds to the nominal voltage of the electricity storage bank 23. Further, the electric power regulator 22 further includes a voltage stabilizing circuit 2224, so that the electric power regulator 22 has a function of stabilizing voltage. As shown in FIG. 4, the voltage stabilizing circuit 2224 is preferably a voltage stabilizing capacitor. The electric power regulator 22 is also provided with a supply 2223. The input terminal of the power supply 2223 is connected to a diode. The ratio of the preset target voltage to the nominal voltage of the electricity storage bank 23 is in the range from 1.1 to 1.3, so that the generator 21 supplies a stable range of voltage to the electricity storage bank 23 and the electrical load 24 after passing through the electric power regulator 22, and the stable range of voltage corresponds to the allowed input voltages of the electricity storage bank 23 and the electrical load 24.

The switch circuit 223 includes high-side MOS transistors Q1, Q3, Q5 and low-side MOS transistors Q2, Q4, Q6. The voltage regulating control circuit 222 includes a voltage regulating control chip 2221 and a high-side driver chip 2222. The G electrode of each of the high-side MOS transistors is connected to the high-side driver chip 2222, the S electrode of each of the high-side MOS transistors is connected to the permanent magnet generator 21, and the D electrode of each of the high-side MOS transistors is connected to the electricity storage bank 23, with the high-side driver chip 2222 controlling the conducting or disconnection of the high-side MOS transistors. The G electrode of each of the low-side MOS transistors is connected to the voltage regulating control chip 2221, the S electrode of each of the low-side MOS transistors is connected to the ground, and the D electrode of each of the low-side MOS transistors is connected to the permanent magnet generator 21, and the voltage regulating control chip 2221 controls the conducting or disconnection of the low-side MOS transistors. In this way, the electrical power supply system (the permanent magnet generator 21 and the electric power regulator 22) on the off-road vehicle can provide a smoother, more stable and reliable DC voltage for the electricity storage bank 23 and the electrical load 24, thereby reducing the interference to the electricity storage bank 23 and the electrical load 24.

The permanent magnet generator 21 is a three-phase permanent magnet generator, and the windings of the three-phase permanent magnet generator are connected by a "Y" connection method. The "Y" connection method is adopted because the voltage of each winding is 220V, the number of coil turns is small, and the wire diameter is slightly larger, which reduces the cost of the electrical power supply system in the off-road vehicle. Further, the windings of the three-phase permanent magnet generator can also be connected by a delta method.

The three-phase terminals of the permanent magnet generator 21 are defined as a first terminal, a second terminal and a third terminal. As shown in FIG. 4, the first terminal is IN1, the second terminal is IN2, and the third terminal is IN3. The high-side MOS transistors include a first MOS transistor (Q1), a third MOS transistor (Q3), and a fifth MOS transistor (Q5). The S electrode of the first MOS transistor Q1 is connected to the third terminal IN3, the S electrode of the third MOS transistor Q3 is connected to the second terminal IN2, and the S electrode of the fifth MOS transistor Q5 is connected to the first terminal IN1. Based on the relative magnitude of the voltage output from the three-phase terminals of the permanent magnet generator 21, the high-side driver chip 2222 controls the high-side MOS transistors Q1, Q3, Q5 so the appropriate one is conducting corresponding with the rotational position of a rotor in the permanent magnet generator 21. The low-side MOS transistors include a second MOS transistor (Q2), a fourth MOS transistor (Q4), and a sixth MOS transistor (Q6). The D electrode of the second MOS transistor Q2 is connected to the third terminal IN3, the D electrode of the fourth MOS transistor Q4 is connected to the second terminal IN2, and the D electrode of the sixth MOS transistor Q6 is connected to the first terminal IN1. Based on the relative magnitude of the voltage output from the three-phase terminals of the permanent magnet generator 21, the voltage regulating control chip 2221 controls the low-side MOS transistors Q2, Q4, Q6 so the appropriate one is conducting corresponding with the rotational position of the rotor in the permanent magnet generator 21. When the engine 41 is running to rotate the rotor of the permanent magnet generator 21, the current output from the permanent magnet generator 21 flows through the high-side MOS transistors Q1, Q3, Q5 to the electricity storage bank 23 and electrical load 24, and after flowing to the negative electrode of the electricity storage bank 23, the current returns to the permanent magnet generator 21 through the low-side MOS transistors Q2, Q4, Q6.

Figure 5:
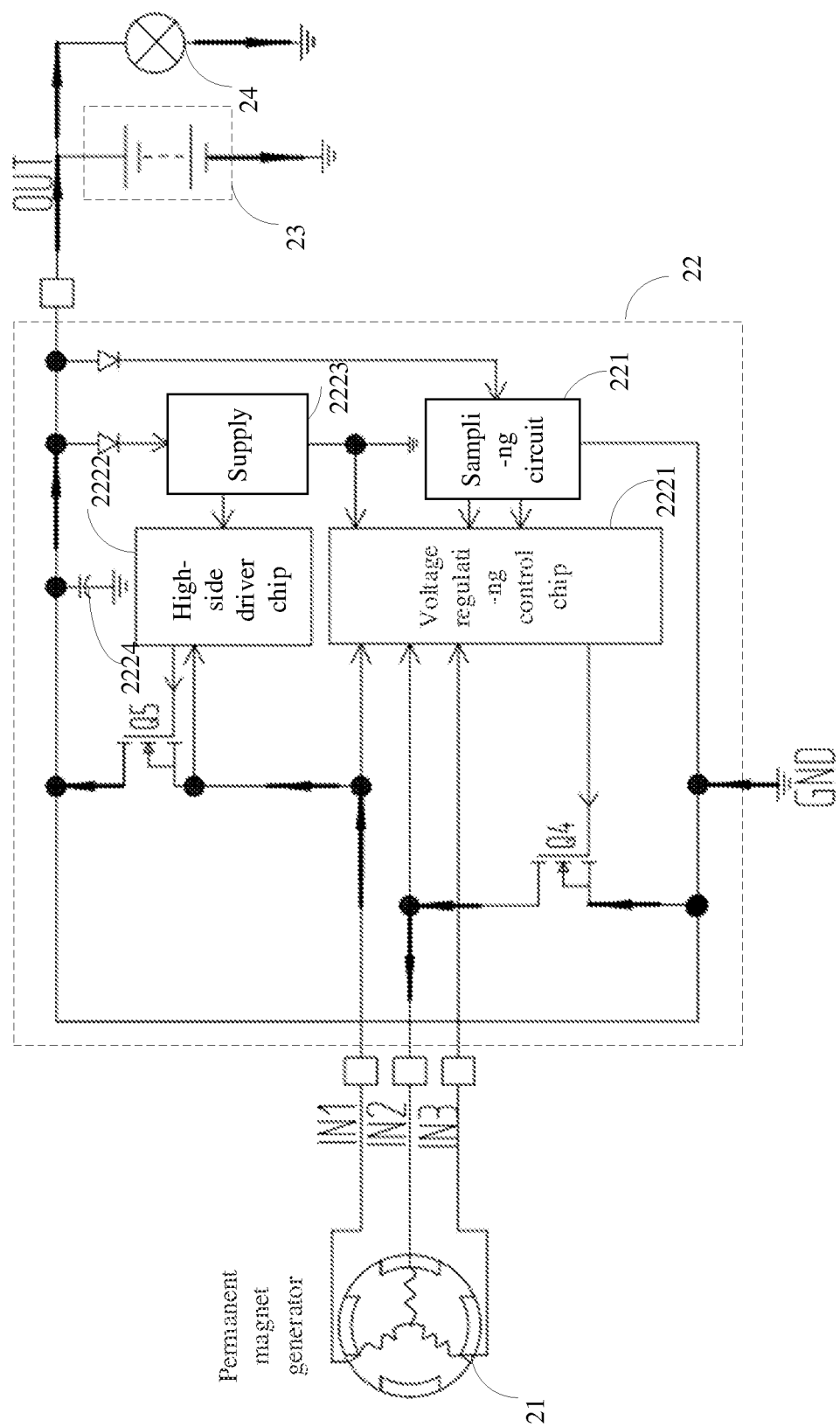
FIG. 5 is the circuit diagram of FIG. 4 at one moment/position of the generator rotor with inactive transistors omitted and showing the direction of current for the electric power regulator.

FIG. 5 depicts a point in time when the rotor of the permanent magnet generator 21 is rotating through a position where the potential e1 of IN1 becomes higher than the potential e2 of IN2. The high-side driver chip 2222 turns on the MOS transistor Q5 and turns off the MOS transistor Q3 (the MOS transistor Q1 is also off); and the voltage regulating control chip 2221 turns on the MOS transistor Q4 and turns off the MOS transistor Q6 (the MOS transistor Q2 is also off). IN1 is connected to the positive electrode, and IN2 is connected to the negative electrode. The voltage between IN1 and IN2 is defined as u12, and u12=e 1-$e2$, which is a positive number. u12 is applied to the load (that is, the electrical load 24), and the current flows from IN1 into the circuit and flows through the MOS transistor Q5 to the electricity storage bank 23 and the electrical load 24, the current flows to the negative electrode of the electricity storage bank 23, returns to IN2 through the MOS transistor Q4, and flows into the permanent magnet generator 21, forming a complete circuit (the direction of current is shown by solid arrows in FIG. 5).

Figure 6:
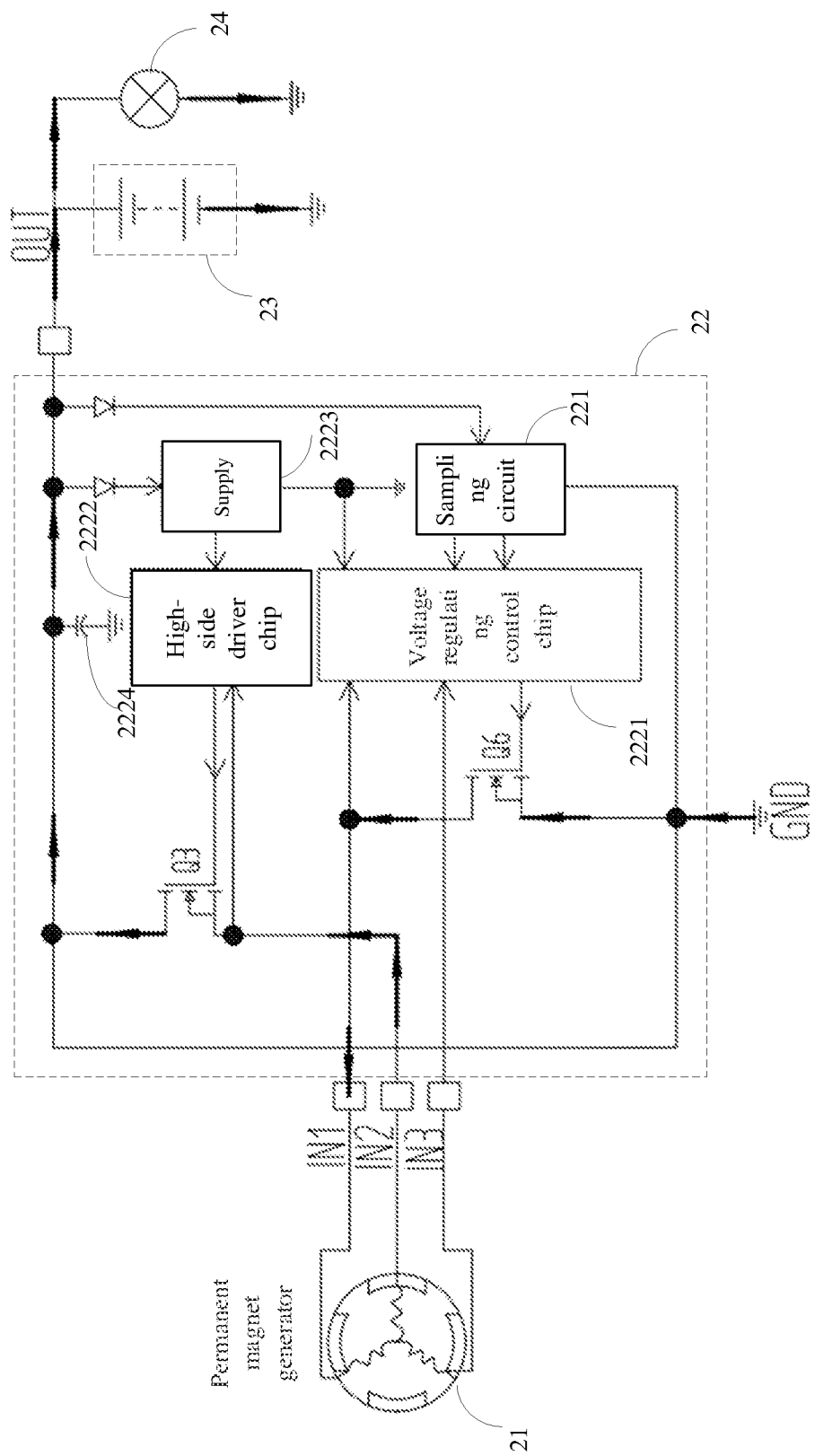
FIG. 6 is the circuit diagram of FIG. 4 at another moment/position of the generator rotor with inactive transistors omitted and showing the direction of current for the electric power regulator.

FIG. 6 depicts another point in time, when the potential e1 of IN1 is lower than the potential e2 of IN2. The high-side driver chip 2222 turns on the MOS transistor Q3, turns off the MOS transistor Q5, and the voltage regulating control chip 2221 turns on the MOS transistor Q6 and turns off the MOS transistor Q4 (MOS transistors Q1 and Q2 are also off). The current flows from IN2, flows into the positive electrode of the electricity storage bank 23 through Q3, flows to the negative electrode of the electricity storage bank 23 through the load (that is, the electrical load 24), and flows to IN1 through Q6. At this time the voltage is: u21=e2−e1. A complete circuit is formed (the direction of current is shown by solid arrows in FIG. 6). Other conducting conditions are similar, but with other sets of MOS transistors being active. In general, the high-side driver chip 2222 compares the potentials of the three input terminals IN1, IN2, and IN3. For the phase with higher potential, the high-side driver chip 2222 turns on the corresponding high-side MOS transistor (Q1, Q3, or Q5) and connects the phase to the output positive electrode; and for the phase with lower potential, the voltage regulating control chip 2221 turns on the corresponding low-side MOS transistor (Q2, Q4, or Q6) and connects the phase to the load 24.

Figure 7:
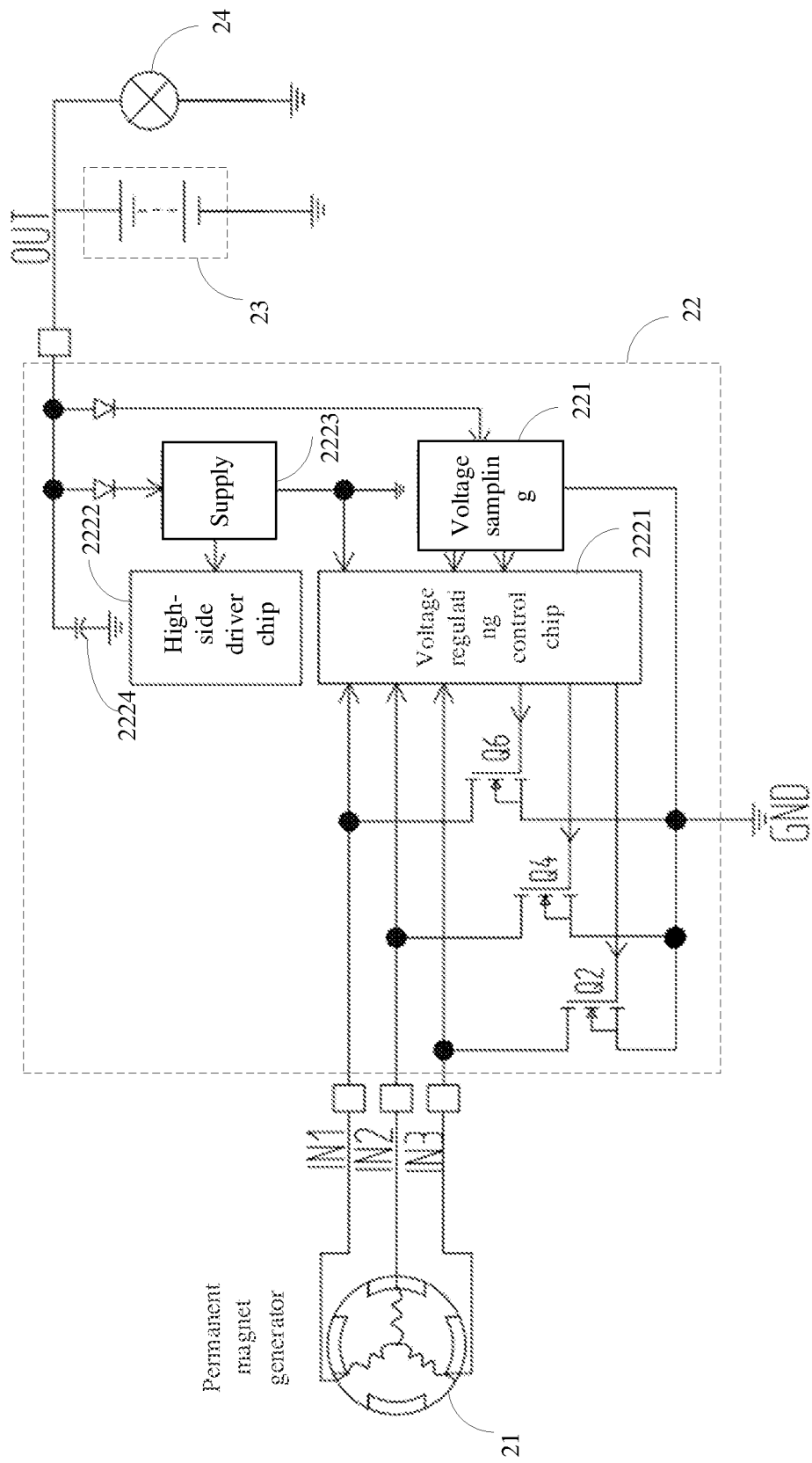
FIG. 7 is the circuit diagram of FIG. 4 at a moment when the voltage of the electricity storage bank exceeds the target voltage and with inactive transistors of the electric power regulator omitted.

In some embodiments, when the actual voltage of the electricity storage bank 23 is greater than the preset target voltage, the voltage regulating control chip 2221 controls all three low-side MOS transistors Q2, Q4, Q6 to be conducting as depicted in FIG. 7. The high-side driver chip 2222 controls all three high-side MOS transistors Q1, Q3, Q5 to be inactive. Current output from the permanent magnet generator 21 flows through the low-side MOS transistors and returns to the permanent magnet generator 21.

As shown in FIG. 7, the voltage regulating control chip 2221 receives the voltage signals detected by the sampling circuit 221 (that is, the voltage sampling in FIG. 7). When the voltage of the output terminal OUT (that is, the actual voltage of the electricity storage bank 23) exceeds the target voltage (that is, the preset target voltage, which corresponds to the nominal voltage of the electricity storage bank 23), the voltage regulating control chip 2221 controls the low-side MOS transistors Q2, Q4 and Q6 to be conducting, and the high-side driver chip 2222 controls the high-side MOS transistors Q1, Q3 and Q5 to be inactive. At this time, IN1, IN2, and IN3 are in a conducting state, that is, the three-phase coils of the permanent magnet generator 21 are in a short-circuit state, forming a circuit, and the current is dissipated by the coils of the generator 21. Therefore, when the voltage of the output terminal OUT exceeds the preset target voltage, the voltage and current will not be increased, so as to protect the electricity storage bank 23 and the electrical load 24.

The voltage regulating control chip 2221 controls the conducting or disconnection of Q2, Q4, and Q6, and the high-side driver chip 2222 controls the conducting or disconnection of Q1, Q3, and Q5 to achieve AC to DC, and then the DC is output subject to flows to/from the voltage stabilizing capacitor circuit 2224. The sampling circuit 221 detects the voltage signals of the output terminal OUT and feeds the signals back to the voltage regulating control chip 2221. The voltage regulating control chip 2221 compares the voltage of the output terminal OUT with the preset target voltage and adjusts the conducting time of the low-side MOS transistors Q2, Q4, Q6 according to the difference between the voltage of the output terminal OUT and the target voltage, so as to achieve the purpose of voltage regulating. In some embodiments, the ratio of the regulated voltage output to the bank voltage is in the range from 1.1 to 1.3. It should be noted that the electric power regulator 22 needs to correspond to the electricity storage bank 23, and the electric power regulator 22 is used to regulate the voltage output from the generator 21 to the electricity storage bank 23 according to the nominal voltage of the electricity storage bank 23. The ratio of the regulated voltage output to the bank voltage is in the range from 1.1 to 1.3, that is, the ratio of the output voltage of the electric power regulator 22 to the nominal voltage of the electricity storage bank 23 is in the range from 1.1 to 1.3, so that the generator 21 that generates electric energy during the operation of the off-road vehicle is able to supply electric power for the electricity storage bank 23 to support the electricity consumption of the electrical load 24, which enables the electrical load 24 to operate stably, thereby meeting the demand for the gradual increase in the total electric power of the off-road vehicle.

In some embodiments, the ratio of the bank voltage to the reference voltage is in the range from 2 to 4. The ratio of the bank voltage to the reference voltage is more preferably 2, 3 or 4, that is, the bank voltage is 24V, 36V, or 48V. Since readily available storage batteries can be easily connected in series at 24V, 36V, or 48V, it is easier to connect the electrical load with 24V, 36V, or 48V to the electric power regulator 22 and the electrical load 24 on the off-road vehicle.

The primary use cases of the present invention involve bank voltages that are integer multiples of the reference voltage of 12V, such as 12V, 24V, 36V, 48V, 60V, or 72V, etc. However, the case where the nominal voltage of the electricity storage bank 23 (ie., the bank voltage) is not an integer multiple of the reference voltage 12V but is greater than 12V (for example 16V, 18V, 20V, 26V, or the like) and the output power of the generator 21 in the off-road vehicle is improved by using the electricity storage bank 23 greater than the reference voltage and by using the electric power regulator 22 comeslxonding to the electricity storage bank 23 is also within the scope of this application.

In some embodiments, the output power of the generator 21 is greater than 600 W. In some embodiments, the permanent magnet generator 21 is placed inside the engine 41. In the embodiments of the present application, the cost of the electrical power supply system selected is low while increasing the output power of the generator 21 to meet the demand for the gradual increase in the total power of off-road vehicles.

Figure 8:
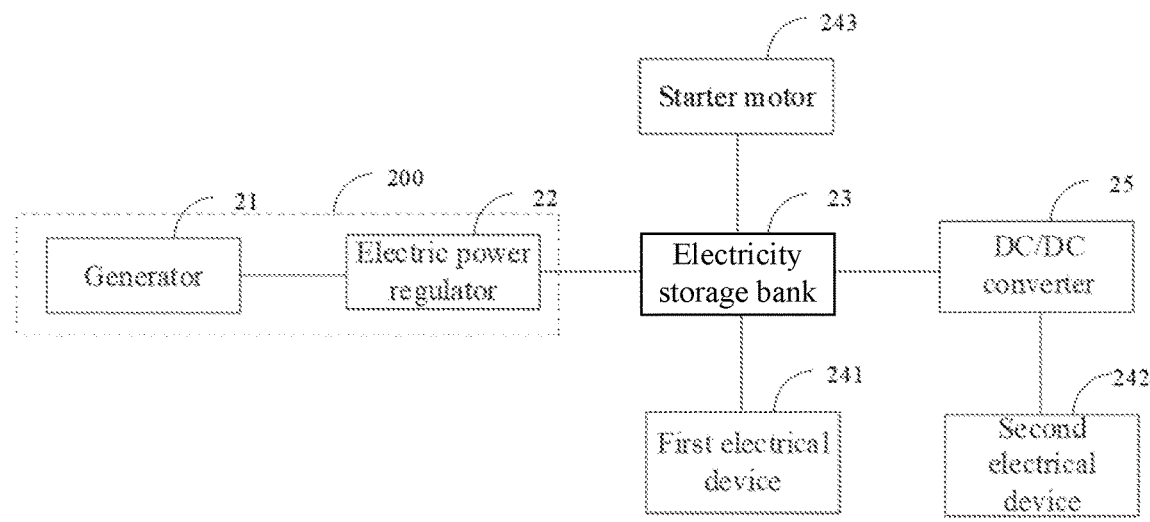
FIG. 8 is a block diagram of another power supply layout in the electrical power supply system of an off-road vehicle according to an embodiment of the disclosure.

FIGS. 2-7 depict the electrical load 24 simply using a single box or symbol. In any given off-road vehicle 100, the electrical load 24 will be made up of multiple devices each with their own wiring and connection points. FIGS. 8-13 represent various embodiments to provide an additional level of detail to the electrical load 24. In all cases, the electric power regulator 22 is connected between the generator 21 and the electricity storage bank 23. FIG. 8 is a block diagram of an embodiment wherein the electrical load 24 includes a first electrical device 241 and a second electrical device 242 in addition to the starter motor 243. The first electrical device 241 and the second electrical device 242 are each disposed on the vehicle body. In this case, the input voltage of the first electrical device 241 is greater than the input voltage of the second electrical device 242.

Figure 13:
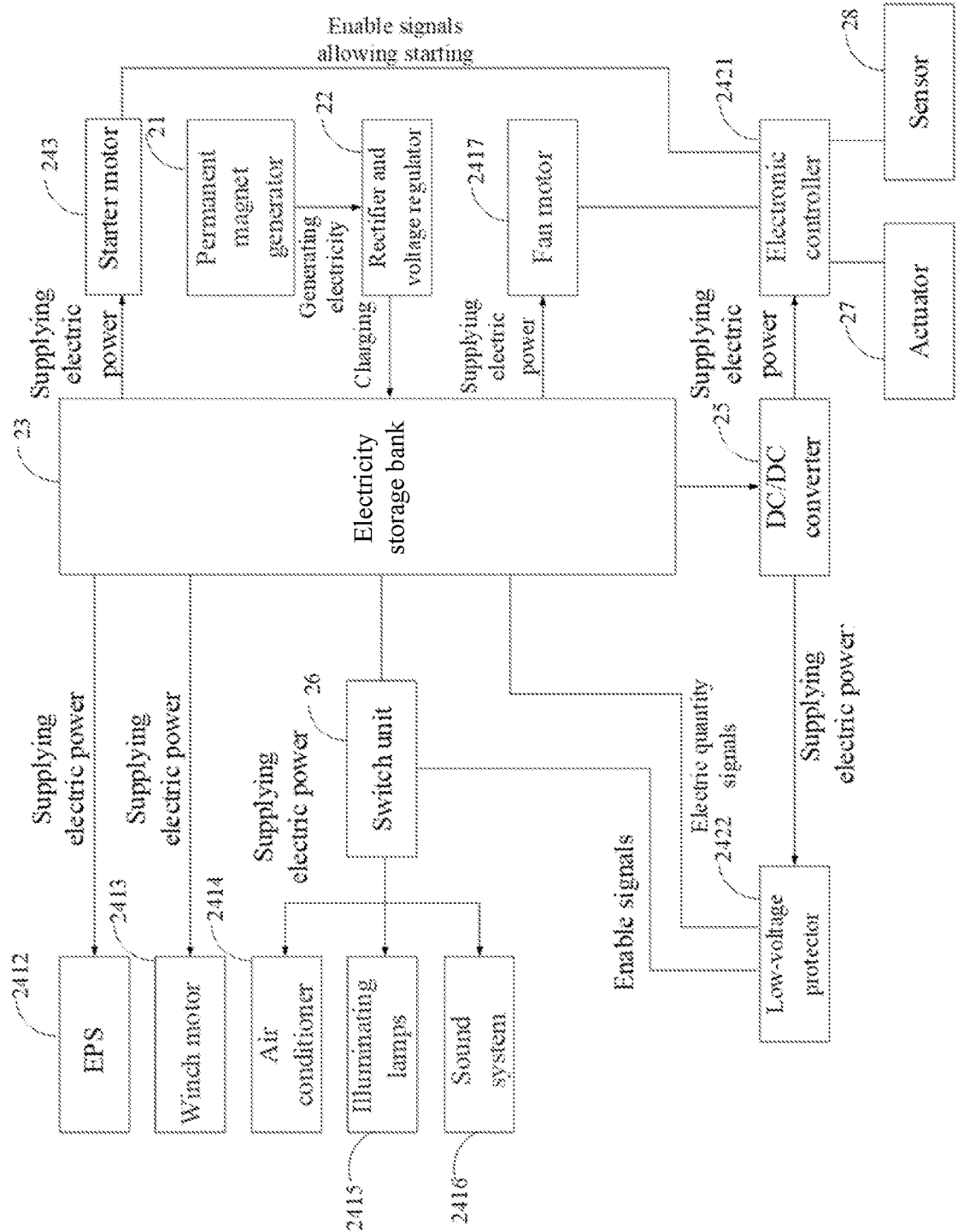
FIG. 13 is a more detailed block diagram of the preferred power supply layout in the electrical power supply system of the off-road vehicle.

For instance, the first electrical device 241 on the off-road vehicle 100 can be selected from the group consisting of: electric power steering (EPS) 2412, a winch motor 2413, an air conditioner 2414, illuminating lamps 2415, a sound system 2416, and a fan motor 2417. FIG. 13 represents an embodiment with all six of these first electrical devices. The second electrical device 242 could be an electronic controller 2421. In the embodiment shown in FIG. 8, the first electrical device 241, the second electrical device 242 and the starter motor 243 are all connected to the electricity storage bank 23. A DC/DC converter 25 is connected between the second electrical device 242 and the electricity storage bank 23, and the DC/DC converter 25 is a step-down DC/DC converter 25. The electricity storage bank 23 preferably supplies electric power for the starter motor 243 and the first electrical device 241 directly and without being stepped-down by the DC/DC converter 25.

Figure 9:
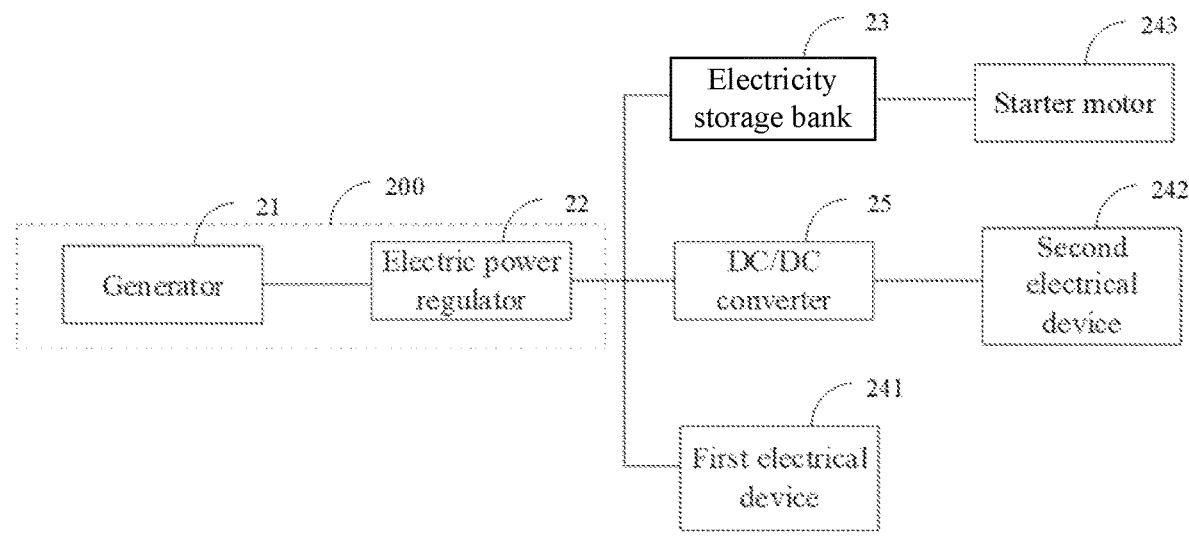
FIG. 9 is a block diagram of another power supply layout in the electrical power supply system of an off-road vehicle according to an embodiment of the disclosure.

In the embodiment shown in FIG. 9, the electricity storage bank 23 directly supplies electric power for only the starter motor 243. The electrical energy output from the electrical power supply system 200 is output directly to the first electrical device 241 and the DC/DC converter 25, as well as to the electricity storage bank 23. Like the embodiment of FIG. 8, the voltage output to the second electrical device 242 has been stepped-down by the DC/DC converter 25.

Figure 10:
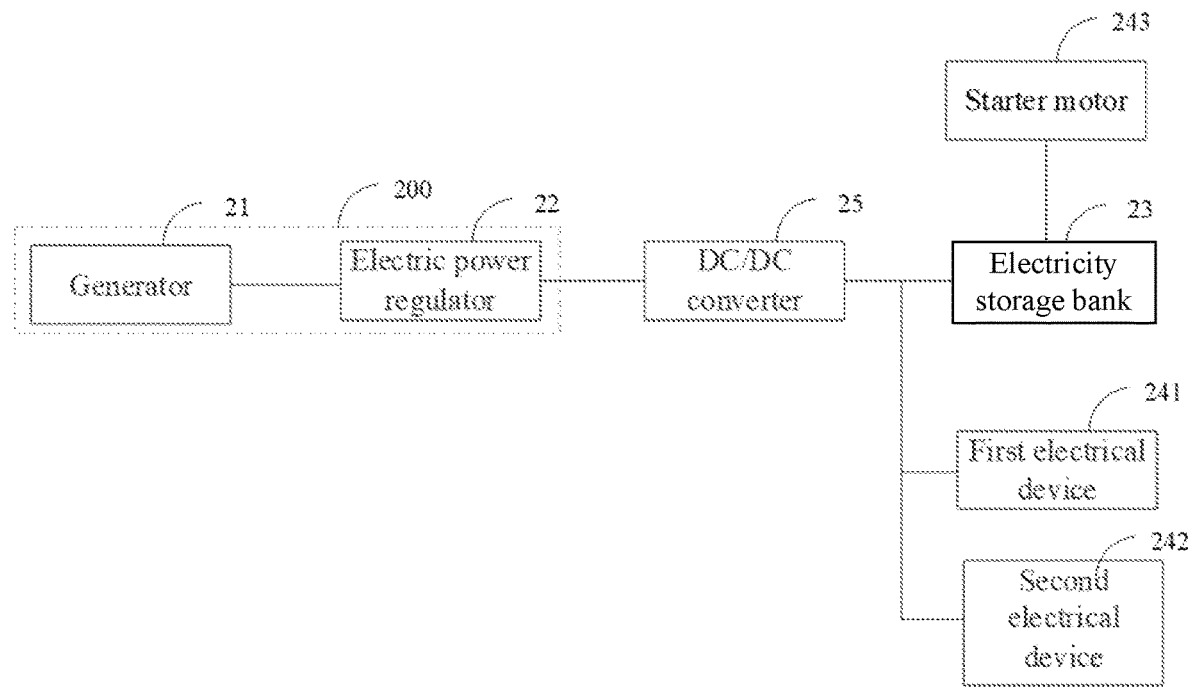
FIG. 10 is a block diagram of another power supply layout in the electrical power supply system of an off-road vehicle according to an embodiment of the disclosure.
Figure 11:
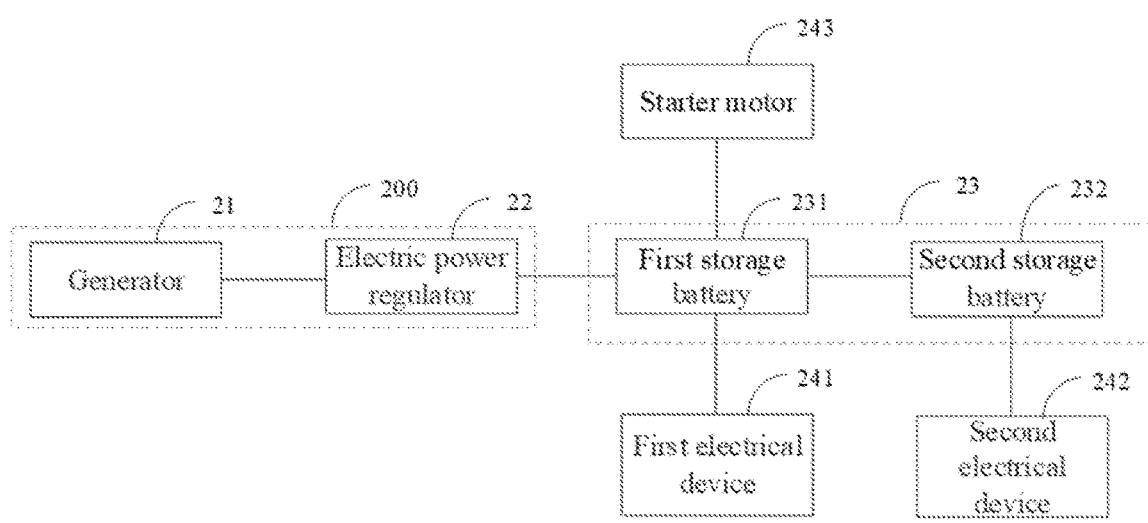
FIG. 11 is a block diagram of another power supply layout in the electrical power supply system of an off-road vehicle according to an embodiment of the disclosure.

FIG. 10 shows an embodiment where the voltage output by the electrical power supply system 200 is greater than desired for charging the electricity storage bank 23. The electric energy output from the electrical power supply system 200 is transmitted to the electricity storage bank 23, the first electric device 241, and the second user device 242, respectively, only after being stepped-down by the DC/DC converter 25. FIG. 11 shows an embodiment wherein the electricity storage bank 23 includes a first storage battery 231 and a second storage battery 232. In this case, the nominal voltage of the first storage battery 231 is greater than the nominal voltage of the second storage battery 232. The first storage battery 231 supplies electric power for the first electrical device 241, and the second storage battery 232 supplies electric power for the second electrical device 242. Compared with the embodiment in FIG. 8, the first storage battery 231 supplies electric power not only for the starter motor 243, but also for the first electrical device 241 selected from the group consisting of electric power steering (EPS) 2421, a winch motor 2413, an air conditioner 2414, illuminating lamps 2415, a sound system 2416, or a fan motor 2417. The second storage battery 232 supplies electric power for the second electrical device 242 including the electronic controller 2421. Since the nominal voltage of the second storage battery 232 is lower than the nominal voltage of the first battery 231, the step-down DC/DC converter 25 in FIG. 8 is not required in this embodiment. In addition, the first storage battery 231 is connected to the second storage battery 232, and the first storage battery 231 may be capable of charging the second storage battery 232 when the electric power of the second battery 232 is lower than the preset electric power. The first storage battery 231 may have sufficient voltage to power the starter motor 243 by itself. Alternatively, not only the first storage battery 231, but also the second storage battery 232 may supply electric power for the starter motor 243.

Figure 12:
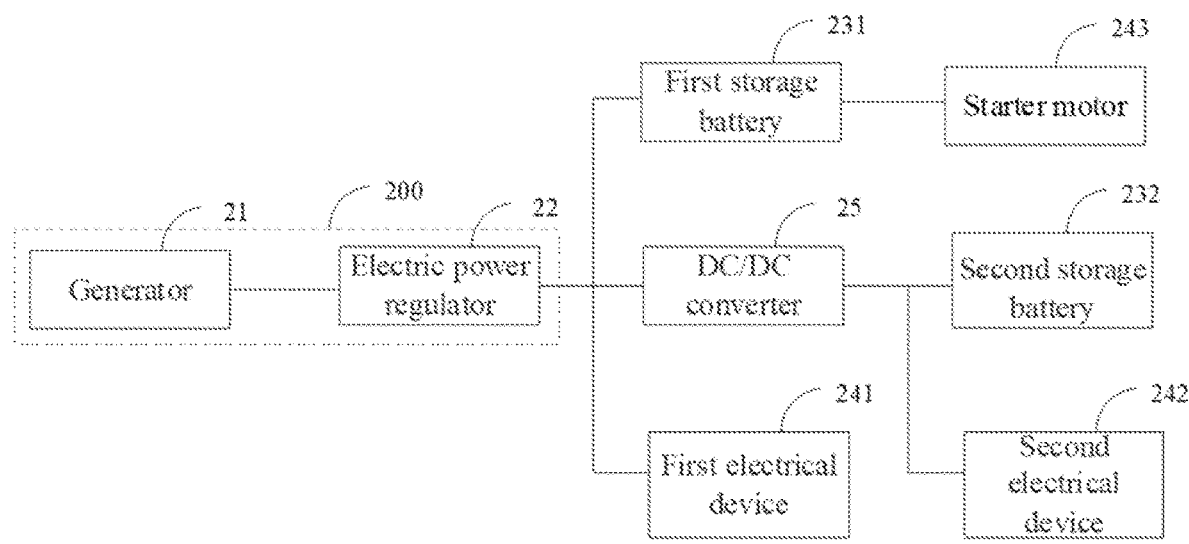
FIG. 12 is a block diagram of another power supply layout in the electrical power supply system of an off-road vehicle according to an embodiment of the disclosure.

FIG. 12 shows an embodiment wherein the DC/DC converter 25 steps down power for the second storage battery 232 as well as the second electrical device 242. The first storage battery 231 is capable by itself of supplying electric power for the starter motor 243. In addition, the electric energy output from the electrical power supply system 200 is directly transmitted to the first storage battery 231 and the first electrical device 241.

In some embodiments represented by FIGS. 11 and 12, the nominal voltage of the first storage battery 231 is two times, three times or four times higher than the nominal voltage of the second storage battery 232. For example, when the nominal voltage of the second battery 232 is 12V, the nominal voltage of the first battery 231 might be 24V, 36V, or 48V.

FIG. 13 also provides an additional layer of detail to how power can be controlled to the various devices within the electrical load 24. In this embodiment, the electronic controller 2421 determines whether the ignition conditions of the off-road vehicle are met when the sensor 28 sends out signals allowing the engine to ignite. If the ignition conditions are met, the electronic controller 2421 sends enable signals allowing starting to the starter motor 243 and controls the actuator 27 on the off-road vehicle to inject fuel to ignite the engine. The electronic controller 2421 also controls the working state of the fan motor 2417 based on the temperature of the engine. For example, when the temperature of the engine is higher than a certain value, the electronic controller 2421 controls the fan motor 2417 to work. While the engine 41 is running, the crankshaft of the engine 41 drives the rotor of the permanent magnet generator 21 to generate electricity. The electricity is rectified and regulated by the voltage regulator 22 and then used to charge the electricity storage bank 23. The electrical storage bank 23 directly supplies electric power for the EPS 2412 and the winch motor 2413, and supplies electric power for the electronic controller 2421 and a low-voltage protector 2422 after being converted by the step-down DC/DC converter 25.

In order to ensure the normal starting and driving of the off-road vehicle 100, the low-voltage protector 2422 detects the voltage of the electricity storage bank 23 and determines the charge state of the electricity storage bank 23 based on the voltage signals. The low voltage protector 2422 sends enable signals to the switch unit 26 to turn on the switch unit 26, thereby allowing the air conditioner 2414, the lighting lamps 2415, and the sound system 2416 to be turned on for use when the charge state of the electricity storage bank 23 is sufficient. The low voltage protector 2422 turns off the switch unit 26 and cuts off the air conditioner 2414, the lighting lamp 2415 and the sound system 2416 when the charge state of the electricity storage bank 23 is less than the threshold set by the low voltage protector 2422.

FIGS. 14-18 represent electrical circuit portions which can be used with the off-road vehicle 100 for additional levels of control over powering of the starter motor 243 and other devices, and more particularly associated with allowing the vehicle 100 to have a "sleep state" with little or no current draw. The off-road vehicle 100 includes a sleep control switch 15 for controlling the off-road vehicle 100 to switch from the sleep state to the preparation stage. In some embodiments, the sleep control switch 15 is an electrical part of a mechanical door lock controlled by a user's rotation of a key, with the sleep control switch 15 being closed whenever the vehicle 100 is unlocked but open whenever the vehicle 100 is locked. The off-road vehicle 100 switches to the preparation stage when the sleep control switch 15 is activated. The electricity storage bank 11 supplies electric energy required for operation of the electric load 24, and the engine 41 of the off-road vehicle 100 is capable of being started at any time during the preparation stage. In other words, to start the engine 41 of the off-road vehicle 100, the user activates the sleep control switch 15 and an ignition switch 115e in sequence. The electricity storage bank 11 supplies the energy required for the starter motor 243, and the starter motor 243 turns the engine 41 during starting of the off-road vehicle 100. The starter motor 243 is mechanically uncoupled from the crankshaft of the engine 41 after internal combustion operation has started, and the engine 41 supplies torque required for the running of the off-road vehicle 100.

Figure 14:
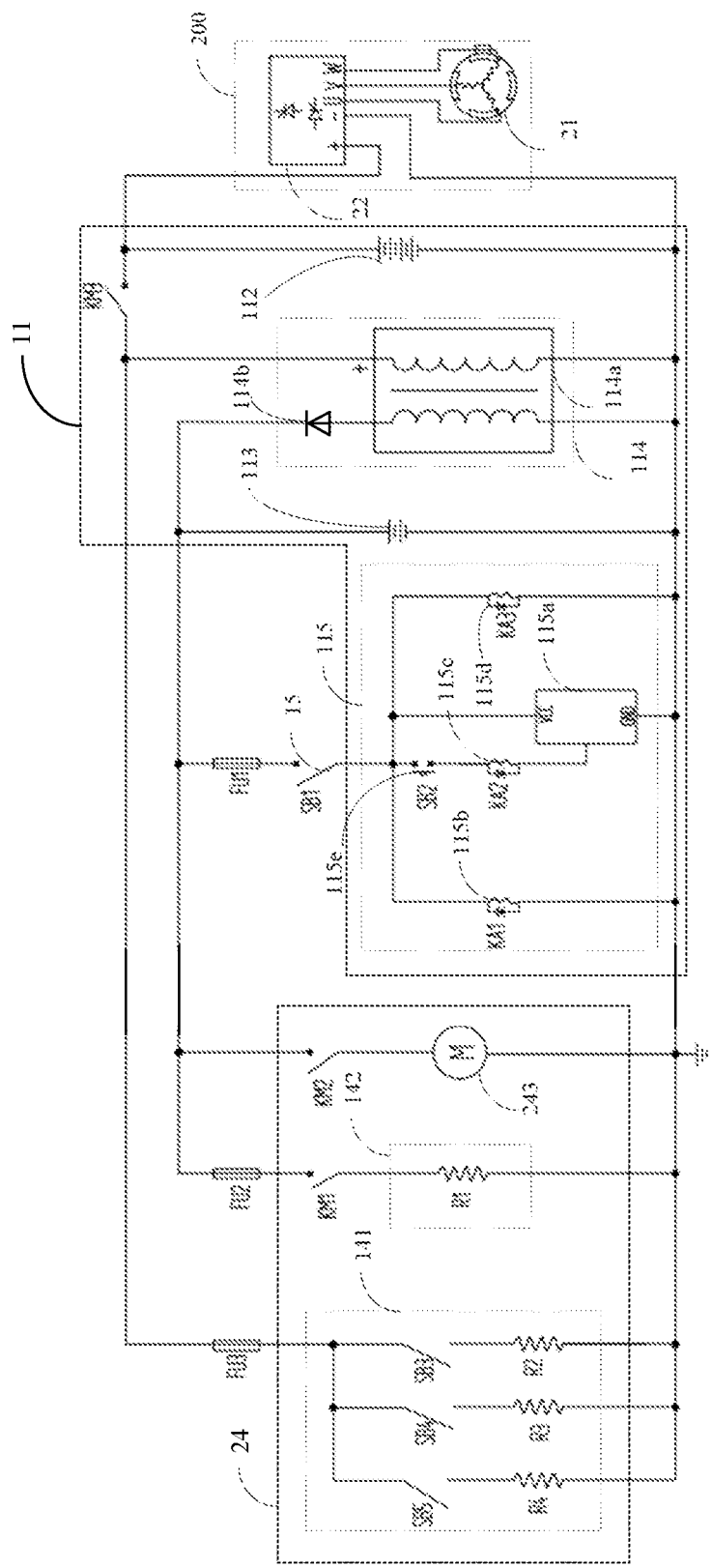
FIG. 14 is a circuit diagram showing a portion of the power supply layout for enabling a sleep state in the off-road vehicle.

As shown in FIG. 14, the electricity storage bank 11 includes a primary battery 112 and a secondary battery 113 connected by a transformer module 114. A control module 115 can be included as part of the electricity storage bank 11, or the control module 115 could alternatively be separate from the electricity storage bank 11. The nominal voltage of the primary battery 112 is the bank voltage, and the nominal voltage of the primary battery 112 is greater than the nominal voltage of the secondary battery 113. The nominal voltage of the primary battery 112 is preferably two times, three times or four times higher than the nominal voltage of the secondary battery 113. The electrical load 24 includes a starter motor 243, a first load 141 and a second load 142. If desired, the electrical load 24 can also include additional electrical devices (not shown), including devices powered directly from the electrical power supply system 200 and not through the electricity storage bank 11. The secondary battery 113 supplies electric power for the starter motor 243 and the second load 142, and the primary battery 112 supplies electric power for the first load 141. The electrical power supply system 200 (including generator 21 and electric power regulator 22) supplies electric power for the electrical load 24, and also charges the primary battery 112 during the operation of the off-road vehicle 100. The transformer module 114 includes a primary winding and a secondary winding. The primary winding is connected to the primary battery 112, and the secondary winding is connected to the secondary battery 113. The voltage output from the primary battery 112 can be transformed by the transformer module 114 and then transmitted to the secondary battery 113 to charge the secondary battery 113. When the charge state of the secondary battery 114 is lower than a preset threshold, the primary battery 112 charges the secondary battery 113. The primary winding of the transformer module 114 is connected to the electrical power supply system 200 in addition to being connected to the primary battery 112, so the electrical power supply system 200 can also charge the secondary battery 113 when the charge state of the secondary battery is lower than a preset threshold.

The secondary battery 113 is connected to the starter motor 243 and supplies current for the starter motor 243, and the primary battery 112 is connected to the first load 141 and supplies current for the first load 141. The first load 141 can include high-power electrical appliances, such as high-brightness spotlights R2, indicator lamps and equipment R3, or indicator auxiliary lighting R4. The circuit where the high-brightness spotlights R2 is located is provided with a switch SB3, the circuit where the indicator lamps and equipment R3 is located is provided with a switch SB4, and the circuit where the indicator auxiliary lighting R4 is located is provided with a switch SB5, so as to allow the corresponding electrical appliances to be turned on through switch SB3, switch SB4, and switch SB5.

As shown in FIG. 14, the transformer module 114 converts the DC voltage of the primary battery 112 or electric power regulator 22 down to a DC voltage appropriate for the secondary battery 113. After the off-road vehicle 100 has been parked or left standing for a long time, the secondary battery 113 can become depleted sufficiently low that the starter motor 243 cannot turn and start the engine 41. In such cases, following closing of the sleep control switch 15, the secondary battery 113 may still have enough power to energize the third relay 115d. With the switch KM3 closed, the primary battery 112 can be used to charge the secondary battery 113 when the charge state of the secondary battery 113 is lower than the preset threshold, thereby ensuring that the secondary battery 113 has sufficient electric power for ignition and starting of the off-road vehicle 100, which greatly improves the stability and reliability of the electricity storage bank 11.

Figure 17:
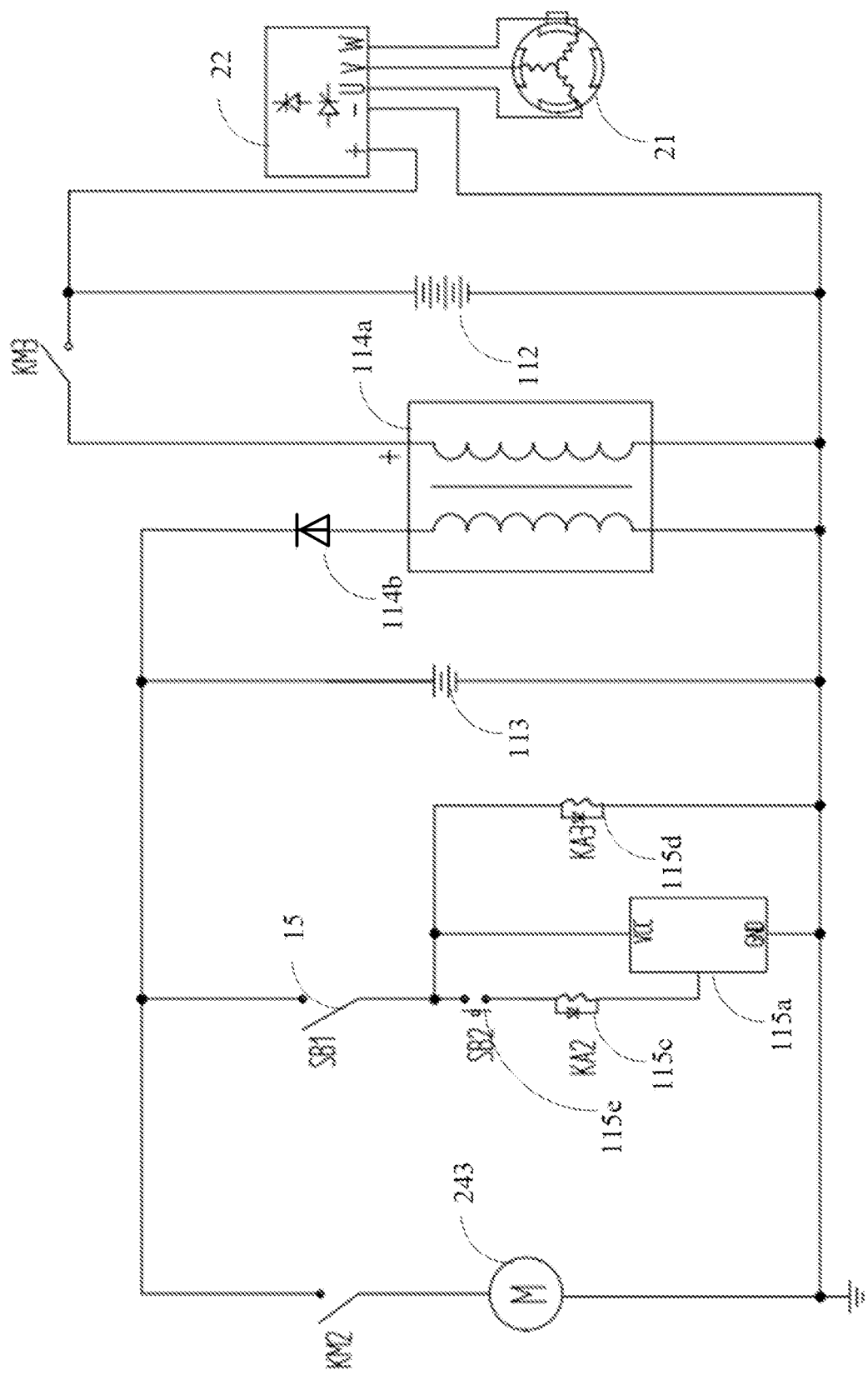
FIG. 17 is a circuit diagram showing the active portions of FIG. 14 through preparation and starting of the engine even if that secondary battery was initially too weak to turn the starter motor.
Figure 18:
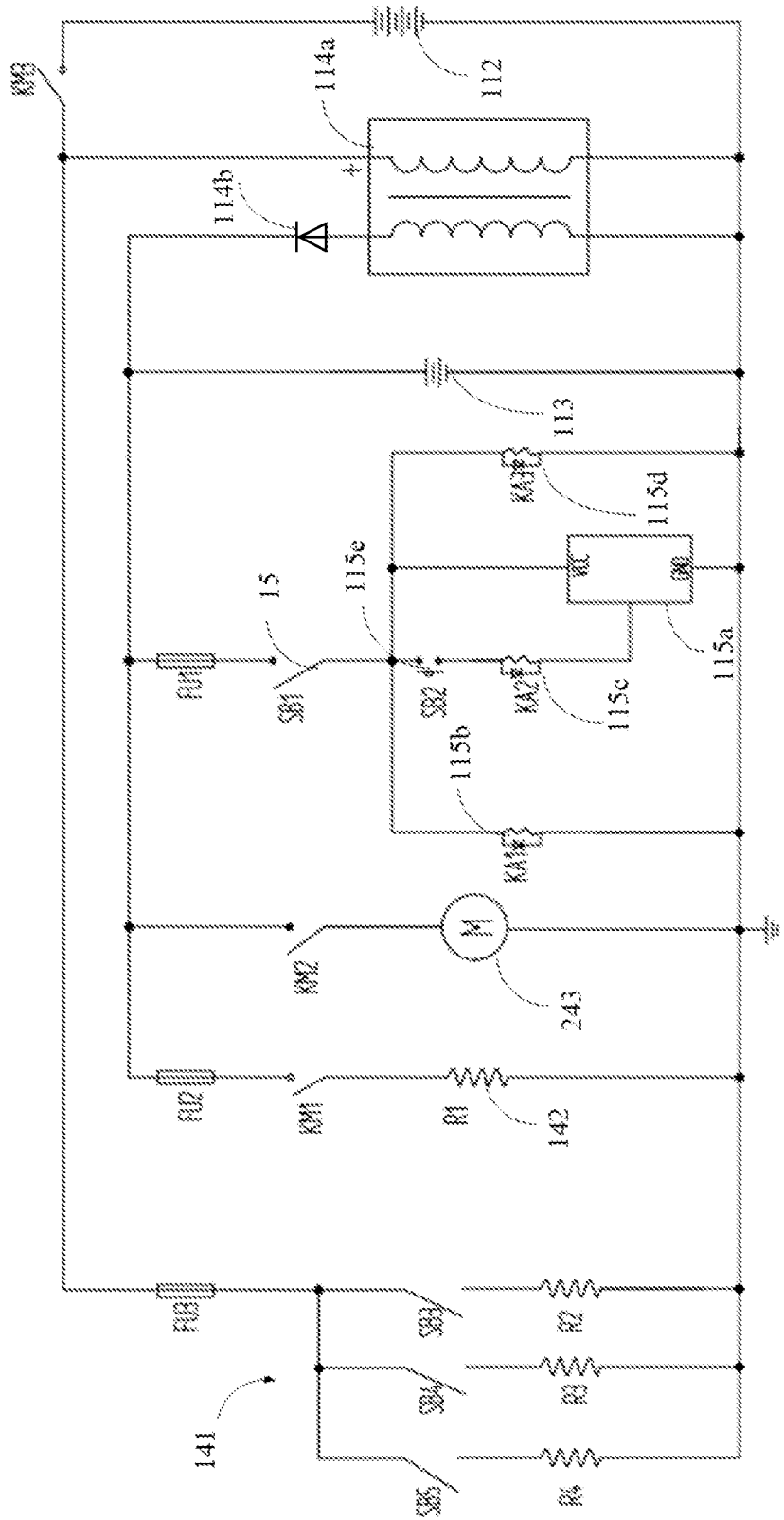
FIG. 18 is a circuit diagram similar to most of the circuit diagram of FIG. 14, but indicating that an alternative generator or alternative power source could be used.

It should be noted that, considering that the off-road vehicle 100 is in the starting stage, the secondary battery 113 needs to supply an instantaneous high current for the starter motor 243 to complete the ignition of the starter motor 243, and the current supplied by the secondary battery 113 is greater than that supplied by the primary battery 112. As shown in FIGS. 14, 17 and 18, as an example, the transformer module 114 preferably includes a transformer 114a and a diode 114b. The transformer 114a includes the primary and secondary windings used for transforming the voltage output from the electrical power supply system 200 or the primary battery 112. The anode of the diode 114b is connected to the secondary winding of the transformer module 114. The voltage output from the primary battery 112 or the electrical power supply system 200 is transformed by the transformer 114a and then uses the circuit through the diode 114b to charge the secondary battery 113.

If the voltage output from the secondary battery exceeds the voltage output by the secondary winding of the transformer 114a, the voltage between the anode and the cathode of the diode 114b applied by the secondary battery 113 is an inverse voltage. At this time, the diode 114b is turned off, which can prevent the output voltage of the secondary battery 113 from flowing to the transformer 114a and the primary battery 112. For instance, when the primary battery 112 is depleted, if the output voltage of the secondary battery 113 is greater than the output voltage of the primary battery 112, the secondary battery 113 cannot charge the primary battery 112 reversely due to the unidirectional conductivity of the diode 114b, and the transformer 114a will not consume the electric power of the secondary battery 113, thereby ensuring that the secondary battery 113 is able to supply current for the starter motor 243, so as to complete the ignition and starting of the off-road vehicle 100. In this way, by utilizing the unidirectional conductivity of the diode 114b to electrically isolate the secondary battery 113 and the primary battery 112, the stability of the electricity storage bank 11 is effectively improved.

As shown in FIG. 14, the off-road vehicle 100 further includes a control module 115. The control module 115 is connected to the secondary battery 113 and the primary battery 112. The control module 115 is capable of controlling electrical switch KM2 for the secondary battery 113 to supply current for the starter motor 243 when the sleep control switch 15 is activated. The control module 115 is capable of controlling electrical switch KM3 for the primary battery 112 to supply current for the first load 141 when the sleep control switch 15 is activated.

The control module 115 includes an Electronic Control Unit (ECU) 115a preferably powered by the secondary battery 113. The connection between the ECU 115a and the secondary battery 113 is controlled by the sleep control switch 15. Thus, whether the ECU 115a is powered on or not is controlled by the sleep control switch 15, so that the working state of the ECU 115a is consistent with the working state of the off-road vehicle 100. Such consistent working states can improve the service life of the ECU 115a, and effectively reduce the likelihood that power consumption of the ECU 115a could cause discharge of the secondary battery 113.

Figure 15:
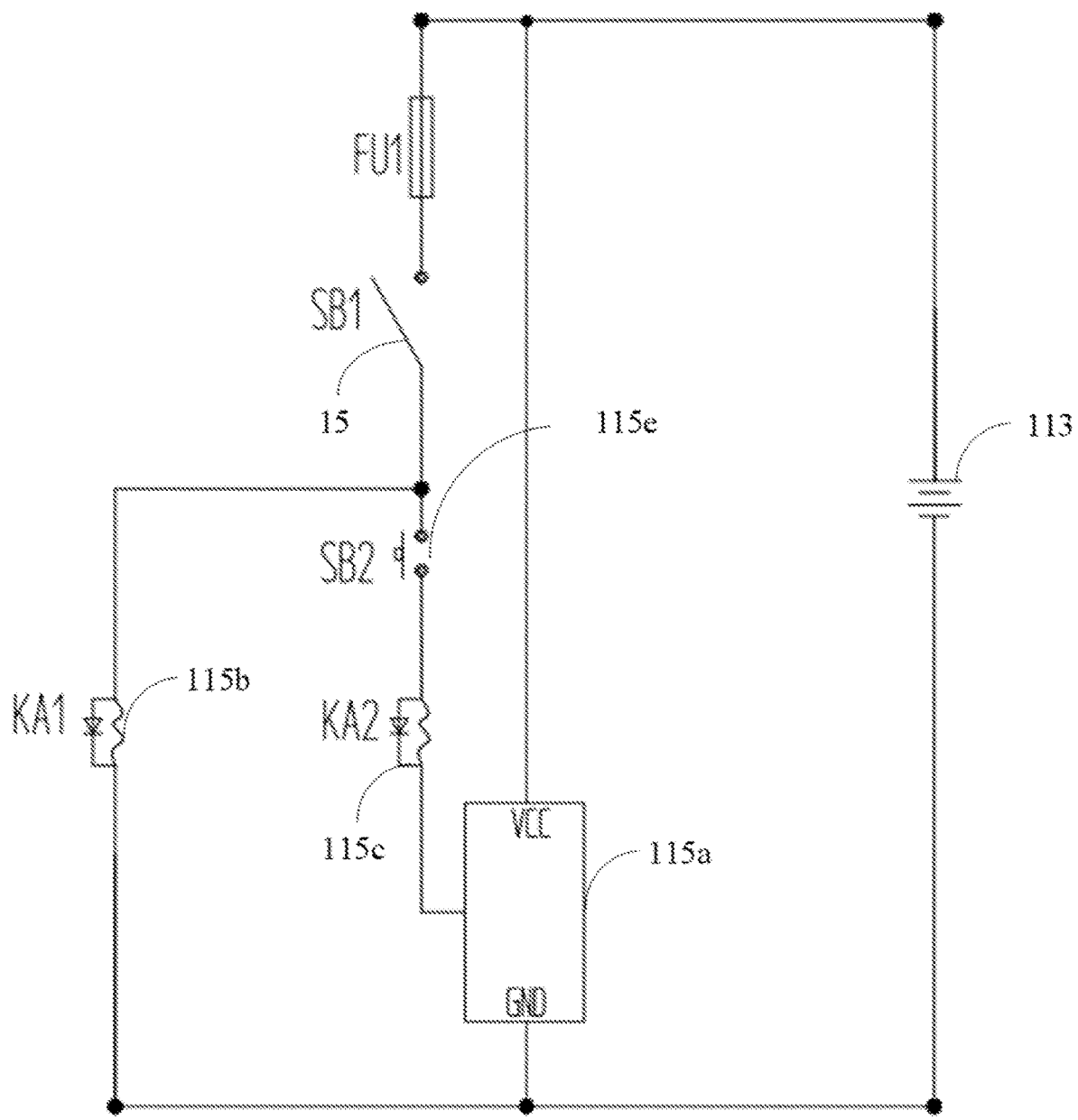
FIG. 15 is a circuit diagram showing an alternative connection for the ECU.

As another embodiment, as shown in FIG. 15, the input terminal of the ECU 115a is connected to the positive electrode of the secondary battery 113. The ground terminal of the ECU 115a is connected to the negative electrode of the secondary battery 113. The power supply between the ECU 115a and the secondary battery 113 is continuously conducted. Compared with the above-mentioned embodiment, whether the ECU 115a is powered on or not is no longer controlled by the sleep control switch 15, so that the secondary battery 113 continuously supplies electric power for the ECU 115a. This keeps the ECU 115a always in the working state, and the data or signals inside the off-road vehicle 100 can be continuously acquired and calculated, and corresponding control can be made.

Electrical appliances on the off-road vehicle 100 and can be divided into the first load 141 and the second load 142 according to their electricity consumption or power, with devices in the second load 142 operating at a lower voltage than those of the first load 141. The second load 142 is connected to the secondary battery 113 and is connected to the secondary winding of the transformer module 114. The voltage output from the primary battery 112 can be transformed by the transformer module 114 to supply electric power for the second load 142. The second load 142 may be an electronic device related to the starting of the off-road vehicle 100, including but not limited to various sensors for measuring the state at starting. The first load 141 refers to one or more devices unrelated to starting of the off-road vehicle 100, including but not limited to high-brightness spotlights, indicator lamps, auxiliary lighting, and the like. It should be noted that, in order to prevent power supply interference (that is, to prevent the secondary battery 113 from supplying electric power for the first load 141), the output voltage of the primary battery 112 after being transformed by the transformer module 114 can be set to be greater than the voltage of the secondary battery 113, so as to prevent the first load 141 from consuming the electric power of the secondary battery 113 to ensure that the secondary battery 113 has enough electric power to support the starter motor 243 to start.

The preferred control module 115 includes a first relay 115b, a second relay 115c, a third relay 115d and an ignition switch 115e, and the control module 115 controls the conducting and disconnection of the circuit through the first relay 115b, the second relay 115c and the third relay 115d. Specifically, the first relay 115b is used to operate switch KM1 and control the connection between the secondary battery 113 and the second load 142. The second relay 115c is used to operate switch KM2 and control the connection between the secondary battery 113 and the starter motor 243. The third relay 115d is used to operate switch KM3 and control the connection between the primary battery 112 and the first load 141. The ignition switch 115e is subject to an external input of the off-road vehicle 100 such as an operator manual control 60a in the cabin 170, and is used to control the off-road vehicle 100 to switch into the starting stage. Alternatively, the ignition switch may be outside the control module, with the control module providing terminals for wired connections to the ignition switch. For instance, in motorcycle or ATV embodiments the ignition switch could be turned on/off by rotating the handlebar. During the starting stage, the user activates the ignition switch 115e, and the second relay 115c is powered on, connecting the secondary battery 113 to the starter motor 243. Further, the circuit where the first load 141 is located is provided with a fuse FU3, the circuit where the second load 142 is located is provided with a fuse FU2, and the circuit where the control module 115 is located is provided with a fuse FU1 to protect the electrical devices.

Figure 16:
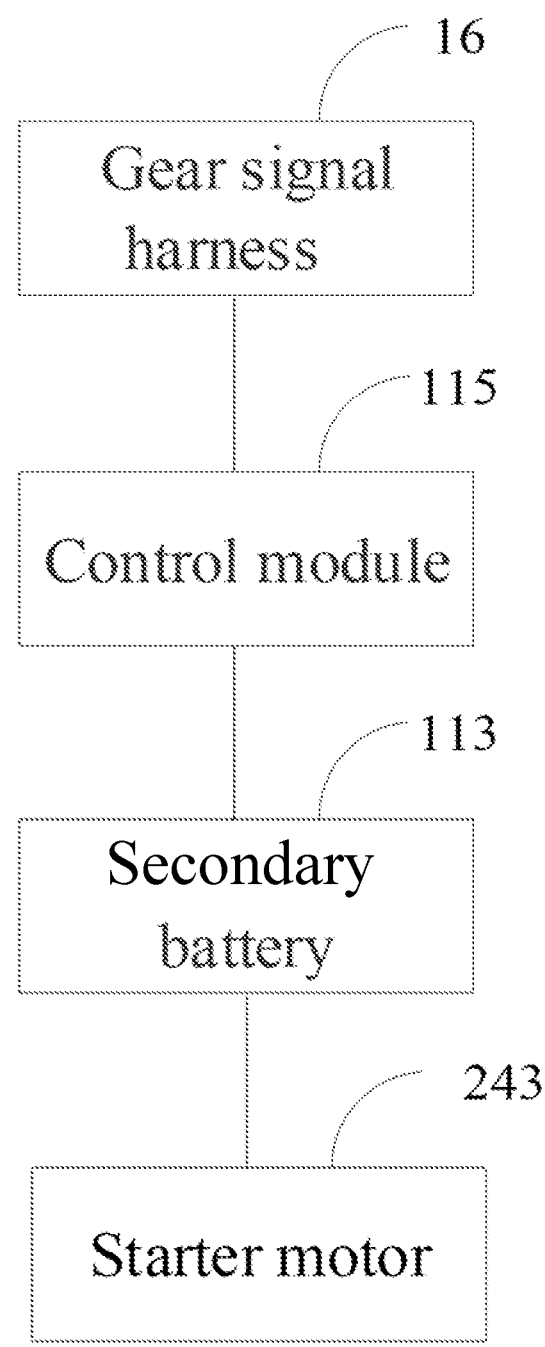
FIG. 16 is a block diagram of an additional, optional layout portion for powering the starter motor.

FIG. 16 represents an additional, optional scheme for controlling operation of the starter motor 243 which can be readily applied to the embodiments of FIGS. 14, 15, 17 and 18. The off-road vehicle 100 generally has multiple gears. For example, the off-road vehicle 100 can have a standard drive gear, one or two low gears, a reverse gear and one or two neutral gears including a neutral gear for parking, all of which are effected in the mechanical transmission between the engine 41 and the wheels 30. The off-road vehicle 100 further includes a gear signal harness 16, which carries associated electrical signals as to which gear the vehicle 100 is in. The control module 115 cooperates with the gear signal harness 16 of the off-road vehicle 100 to determine whether starting of the vehicle is appropriate. As an example, the gear signal harness 16 is connected to the control module 115, and is capable of sending gear signals to the ECU 115a, and the ECU 115a determines whether the starting conditions are met by whether the transmission is in neutral. The second relay 115c is grounded via the ECU 115a. When the off-road vehicle 100 is in gear, the ECU 115a opens the ground connection so the second relay 115c cannot respond to the control of the ignition switch 115e, leaving the connection between the secondary battery 113 and the starter motor 243 in a disconnected state. When the ECU 115a receives a neutral gear signal transmitted by the gear signal harness 16, it connects the ground connection of the second relay 115c. When the ignition switch 115e is activated thereafter, the second relay 115c closes the switch KM2, and the circuit connection between the secondary battery 113 and the starter motor 243 is completed. The ECU 115a thus controls whether the ignition switch 115e enables the secondary battery 113 to supply current for the starter motor 243.

The electrical power supply system 200 in FIG. 14 includes a generator 21 and an electric power regulator 22 similar to embodiments of FIGS. 2-13. The electrical power supply system 200 is connected directly to the primary battery 112 to charge the primary battery 112. The electrical power supply system 200 is connected to the secondary battery 113 through the transformer module 114. The voltage output from electrical power supply system 200 is transformed by the transformer module 114 and then transmitted to the secondary battery 113 to charge the secondary battery 113. During running of the vehicle 100, the electrical power supply system 200 is connected to the electrical load 24 and supplies electric power for the electrical load 24.

The off-road vehicle 100 needs a very high instantaneous current for powering the starter motor 243. Therefore, compared with the primary battery 112, the design of the secondary battery 113 may be low-voltage and high-current discharge. The first load 141 needs a small current that is stable for a long time. Therefore, compared with the secondary battery 113, the battery capacity of the primary battery 112 is larger, and the design of the primary battery 112 may be high-voltage and low-current discharge.

It should be noted that in order to ensure that the secondary battery 113 and the primary battery 112 can be charged/discharged normally, what needs to be met is that the DC voltage U2 output from the primary battery 112 is greater than the DC voltage U1 output from the secondary battery 113, and the DC voltage U output from the electric power regulator 22 is greater than the DC voltage U2 output from the primary battery 112, is greater than the DC voltage U3 output from the transformer module 114, and is greater than the DC voltage U1 output from the secondary battery 113.

FIG. 17 shows the portions of the circuit that are active through preparation and starting of the engine 41 even if the secondary battery 113 was initially too weak to turn the starter motor. When the user activates the sleep control switch 15, the off-road vehicle 100 is switched into the preparation stage, the ECU 115a determines whether the acceptable starting conditions (such as being in neutral gear) of the off-road vehicle 100 are met. When the starting conditions of the off-road vehicle are met, the second relay 115c is grounded via the ECU 115a. The user activates the ignition switch 115e, the off-road vehicle 100 is switched into the starting stage through powering the second relay 115c on. The second relay 115c controls the switch KM2, completing the circuit connection between the secondary battery 113 and the starter motor 243. If the secondary battery 113 is sufficiently charged, the starter motor 243 turns the engine 41 during the starting stage to begin internal combustion operation. Under internal combustion operation, the engine 41 provides energy to the generator 21 by rotation of its rotor, which the generator 21 converts into alternating current output to the electric power regulator 22, which is rectified into direct current and output by the electric power regulator 22. The DC voltage output from the electric power regulator 22 is defined as U. The electric power regulator 22 is connected to the primary battery 112, and outputs the DC voltage U to the primary battery 112 for charging the primary battery 112. At the same time, the DC voltage U output from the electric power regulator 22 also passes through the transformer module 114. The DC voltage U is transformed through the transformer 114a of the transformer module 114, and then is output to the secondary battery 113 through the diode 114b so as to charge the secondary battery 113. Even if the secondary battery 113 is so depleted as to be too weak to start the engine 41, it hopefully has enough charge to power the third relay 115d on, which in turn closes the switch KM3. With the charge state of the secondary battery 113 being lower than the preset threshold, the primary battery 112 begins charging the secondary battery 113 immediately upon the user's activation of the sleep control switch 15. Either upon sufficient charging from the depleted condition and/or with assistance of current from the transformer module 114, the starter motor 243 can sufficiently turn the engine 41 for internal combustion operation to begin. The engine 41 should then be run under internal combustion operation until the charging operation for the secondary battery 113 and the primary battery 112 is completed.

During internal combustion running of the engine 41 and most conditions of current draw from the various electrical devices on the off-road vehicle 100, The DC voltage U output from the electric power regulator 22 will be greater than the DC voltage U2 of the primary battery 112, so during internal combustion running of the engine 41 the DC voltage U will be applied to the primary winding of the transformer 114a. With DC voltage U applied to the primary winding, the transformer output voltage U3 is greater than or equal to the DC voltage U1 output from the secondary battery 113. Even in the case that the engine 41 is not running or regulator output U is otherwise lower than the primary battery voltage U2, the transformer output voltage U3 will ordinarily be greater than the secondary battery voltage U1 such that the secondary battery 113 functions as a load. In this way, the primary battery 112 can supply electric power for the first load 141, and the interference of the power supply caused by the secondary battery 113 can be avoided even without the diode 114b.

FIG. 18 shows the same circuit as FIG. 14 except without the generator 21 and without the electric power regulator 22. The circuit of FIG. 18 can thus be used for other off-road vehicles that have other primary power supplies, both including other types of generators and other fuel sources such as electric vehicles. The embodiments of the present disclosure may also be applied to motorcycles. It should be noted that the specific embodiments described herein are used to illustrate this application, not to limit the application. According to the embodiments provided in the present application, all other embodiments obtained by those skilled in the art without creative work fall within the scope of the present application.

Obviously, the drawings are only some examples or embodiments of the present application, and for those skilled in the art, the present application can also be applied to other similar situations according to these drawings, but no creative work is required. In addition, it should be noted that although the work done in this development process may be complex and lengthy, for those skilled in the art, modifications on certain designs, manufactures and productions based on the technical content disclosed in this application are only conventional technical means, and should not be regarded as insufficient content disclosed in this application.

The term "embodiment" used in this application means that particular features, structures, or characteristics described in connection with the embodiment may be comprised in at least one embodiment of the application. The appearance of the phrase in various places in the specification does not necessarily mean the same embodiment, nor does it mean that it is mutually exclusive or alternative to other embodiments. It can be clearly or implicitly understood by those skilled in the art that the embodiments described in this application may be combined with other embodiments without conflict.

The above-mentioned embodiments only represent several embodiments of the present application, and the descriptions thereof are relatively specific and detailed, but should not be construed as a limitation to the scope of protection. It should be noted that for those skilled in the art, without departing from the concept of the present application, several modifications and improvements can be made, which all belong to the scope of the present application. Therefore, the scope of the present application should be determined by the appended claims.

What is claimed is:

1. An off-road vehicle comprising:
   a vehicle body;
   a plurality of wheels comprising a first front wheel, a second front wheel, a first rear wheel, and a second rear wheel;
   at least one seat disposed on the vehicle body, the seat comprising at least a driver's seat;
   a suspension system comprising a front suspension and a rear suspension, the first front wheel, and the second front wheel being connected to the vehicle body by the front suspension, and the first rear wheel and the second rear wheel being connected to the vehicle body by the rear suspension;
   a power system for providing power to the off-road vehicle disposed on the vehicle body, at least one of the first front wheel, the second front wheel, the first rear wheel, and the second rear wheel being connected to the power system, the power system comprising at least an engine;

an operator manual control disposed on the vehicle body for manipulating the running of the off-road vehicle;

an electrical load provided by one or more devices disposed on the vehicle body, the one or more devices comprising at least a starter motor for starting the engine of the off-road vehicle;

an electricity storage bank disposed on the vehicle body, the electricity storage bank being connected to the electrical load, and the electricity storage bank being at least used to supply electric power for the starter motor when the engine needs to be started, and the starter motor after powered driving the engine to start;

a generator for generating electric energy disposed on the power system, and the electric energy generated by the generator is used to supply electric power for the electricity storage bank; and an electric power regulator disposed on the vehicle body for regulating the voltage output from the generator to the electricity storage bank, and the electric power regulator being disposed between the generator and the electricity storage bank;

wherein the generator is a permanent magnet generator, the nominal voltage of the electricity storage bank is defined as the bank voltage, the ratio of the bank voltage to a reference voltage is in the range from 2 to 3, and the reference voltage is in the range from 12V to 24V; the electric power regulator comprises a sampling circuit, a voltage regulating control circuit and a switching circuit, the voltage regulating control circuit is respectively connected to the sampling circuit and the switching circuit, the electric power regulator corresponds to the electricity storage bank and is capable of regulating the voltage output from the generator to the electricity storage bank according to the nominal voltage of the electricity storage bank, and the output voltage of the electric power regulator is greater than the bank voltage;

wherein the sampling circuit is connected to the electricity storage bank in addition to being connected to the voltage regulating control circuit, the sampling circuit is used to detect actual voltage of the electricity storage bank, and the voltage regulating control circuit controls the conducting time of the switching circuit based on the actual voltage and a preset target voltage; and the preset target voltage corresponds to the nominal voltage of the electricity storage bank.

2. The off-road vehicle of claim 1, wherein the ratio of the preset target voltage to the nominal voltage of the electricity storage bank is in the range from 1.1 to 1.3.

3. The off-road vehicle of claim 2, wherein the switching circuit comprises a plurality of high-side MOS transistors and a plurality of low-side MOS transistors, the voltage regulating control circuit comprises a voltage regulating control chip and a high-side driver chip, a G electrode of each high-side MOS transistor is connected to the high-side driver chip, an S electrode of each high-side MOS transistor is connected to the permanent magnet generator, and a D electrode of each high-side MOS transistor is connected to the electricity storage hank, and the high-side driver chip controls the conducting or disconnection of the high-side MOS transistors; a G electrode of each low-side MOS transistor is connected to the voltage regulating control chip, an S electrode of each low-side MOS transistor is connected to the ground, and a D electrode of each low-side MOS transistor is connected to the permanent magnet generator, and the voltage regulating control chip controls the conducting or disconnection of the low-side MOS transistors.

4. The off-road vehicle of claim 3, wherein the permanent magnet generator is a three-phase permanent magnet generator, and the windings of three-phase permanent magnet generator are connected by a Y connection method.

5. The off-road vehicle of claim 4, wherein when the permanent magnet generator of the off-road vehicle is driven by the engine, current output from the permanent magnet generator flows through the high-side MOS transistors to the electricity storage bank, and returns from a negative electrode of the electricity storage bank to the permanent magnet generator through the low-side MOS transistors.

6. The off-road vehicle of claim 5, wherein three-phase terminals of the permanent magnet generator are defined as a first terminal, a second terminal and a third terminal, the high-side MOS transistors comprise a first MOS transistor, a third MOS transistor and a fifth MOS transistor, the S electrode of the first MOS transistor is connected to the third terminal, the S electrode of the third MOS transistor is connected to the second terminal, and the S electrode of the fifth MOS transistor is connected to the first terminal; the high-side driver chip controls conducting of one MOS transistor of the high-side MOS transistors based on relative magnitude of voltage output from the three-phase terminals of the permanent magnet generator; the low-side MOS transistors comprise a second MOS transistor, a fourth MOS transistor, and a sixth MOS transistor, the D electrode of the second MOS transistor is connected to the third terminal, the D electrode of the fourth MOS transistor is connected to the second terminal, and the D electrode of the sixth MOS transistor is connected to the first terminal; the voltage regulating control chip controls conducting of one of the low-side MOS transistors based on the relative magnitude of the voltage output from the three-phase terminals of the permanent magnet generator.

7. The off-road vehicle of claim 3, wherein when the actual voltage is greater than the preset target voltage, the voltage regulating control chip controls the low-side MOS transistors to be conducting, the high-side driver chip controls the high-side MOS transistors to be disconnected, and current output from the permanent magnet generator flows through the low-side MOS transistors and returns to the permanent magnet generator.

8. The off road vehicle of claim 1, wherein a ratio of the output voltage of the electric power regulator to the hank voltage is in the range from 1.1 to 1.3.

9. The off-road vehicle of claim 1, wherein the bank voltage is in the range from 24V to 48V.

10. The off-road vehicle of claim 1, wherein the hank voltage is 24V, 36V, 48V, or 72V.

11. The off-road vehicle of claim 1, wherein the output power of the generator is greater than 600 W, the generator is driven to generate electricity after the engine is started, and the permanent magnet generator is placed inside the engine.

12. The off-road vehicle of claim 1, wherein the at least one or more devices of the electrical load further comprises a first electrical device and a second electrical device, and the input voltage of the first electrical device is greater than the input voltage of the second electrical device.

13. The off-road vehicle of claim 12, wherein the first electrical device and the second electrical device are both connected to the electricity storage bank, and a DC/DC converter is connected between the second electrical device and the electricity storage bank, and the DC/DC converter is a step-down DC/DC convener.

14. The off-road vehicle of claim 12, wherein the electricity storage bank comprises a first storage battery and a second storage battery, the nominal voltage of the first storage battery is the bank voltage, the nominal voltage of the first storage battery is greater than the nominal voltage of the second storage battery, the first storage battery supplies electric power tier the first electrical device, and the second storage battery supplies electric power for the second electrical device.

15. The off-road vehicle of claim 12, wherein the nominal voltage of the first storage battery is two times, three times or four times higher than the nominal voltage of the second storage battery.

16. The off-road vehicle of claim 12, wherein the first electrical device comprises at least one device selected from the group consisting of: electric power steering (EPS), a winch motor, an air conditioner, illuminating lamps, a sound system, and a fan motor; and the second electrical device comprises an electronic controller.

17. The off-road vehicle of claim 16, further comprising a low-voltage protector connected to the electricity storage bank, the low-voltage protector is used for detecting the charge state of the electrical storage bank and controlling supply of electric power for the air conditioner, the illuminating lamps or the sound system according to the detected charge state.

18. The off-road vehicle of claim 12, wherein the first electrical device comprises a fan motor and the second electrical device comprises an electronic controller, wherein one terminal of the fan motor is connected to the electricity storage bank, another terminal of the fan motor is connected to the electronic controller, and the electronic controller is capable of controlling the fan motor according to temperature of the engine.

19. The off-road vehicle of claim 1, wherein the electricity storage bank comprises a primary battery and a secondary battery, the nominal voltage of the primary battery is the bank voltage, the nominal voltage of the primary battery is greater than the nominal voltage of the secondary battery, the electrical load comprises a starter motor and a first device, the secondary battery supplies electric power ter the starter motor, and the primary battery supplies electric power tier the first device; a transformer module is connected between the primary battery and the secondary battery, the transformer module comprises an primary winding and an secondary winding, the primary winding is connected to the primary battery, and the secondary winding is connected to the secondary battery, a voltage output from the primary battery is able to be transformed by the transformer module and then transmitted to the secondary battery to charge the secondary battery; wherein the primary battery charges the secondary battery when the charge state of the secondary battery is lower than a preset threshold.

20. The off-road vehicle of claim 19, wherein the off-road vehicle further comprises a control module, the control module is connected to the primary battery and is capable of controlling a supply of current for the first device and to charge the secondary battery, the control module is also connected to the secondary battery, and is capable of controlling a supply of current for the starter motor; wherein the current supplied by the secondary battery is greater than the current supplied by the primary battery.

* * * * *

UNITED STATES PATENT AND TRADEMARK OFFICE
CERTIFICATE OF CORRECTION

| | |
|---|---|
| PATENT NO. | : 11,685,323 B2 |
| APPLICATION NO. | : 17/896975 |
| DATED | : June 27, 2023 |
| INVENTOR(S) | : Guo Liu et al. |

It is certified that error appears in the above-identified patent and that said Letters Patent is hereby corrected as shown below:

In the Specification

At Column 10, Line 39, delete "comeslxonding" and insert therefor --corresponding--;

In the Claims

At Column 19, Line 59, delete "hank" and insert therefor --bank--;

At Column 20, Line 48, delete "hank" and insert therefor --bank--;

At Column 20, Line 65, delete "convener" and insert therefor --converter--;

At Column 21, Line 5, delete "tier" and insert therefor --for--;

At Column 22, Line 7, delete "ter" and insert therefor --for--; and

At Column 22, Line 9, delete "tier" and insert therefor --for--.

Signed and Sealed this
Nineteenth Day of September, 2023

Katherine Kelly Vidal
*Director of the United States Patent and Trademark Office*